US010693355B2

(12) United States Patent
Sasaki et al.

(10) Patent No.: US 10,693,355 B2
(45) Date of Patent: Jun. 23, 2020

(54) COIL UNIT ARRANGEMENT DEVICE

(71) Applicant: FUKUI PREFECTURAL GOVERNMENT, Fukui-shi, Fukui (JP)

(72) Inventors: Yoshinori Sasaki, Fukui (JP); Taiki Tanaka, Fukui (JP); Masaki Hashimoto, Fukui (JP)

(73) Assignee: FUKUI PREFECTURAL GOVERNMENT, Fukui-shi, Fukui (JP)

( * ) Notice: Subject to any disclaimer, the term of this patent is extended or adjusted under 35 U.S.C. 154(b) by 240 days.

(21) Appl. No.: 15/741,644

(22) PCT Filed: Jun. 29, 2016

(86) PCT No.: PCT/JP2016/169233
§ 371 (c)(1),
(2) Date: Jan. 3, 2018

(87) PCT Pub. No.: WO2017/006819
PCT Pub. Date: Jan. 12, 2017

(65) Prior Publication Data
US 2018/0212498 A1    Jul. 26, 2018

(30) Foreign Application Priority Data
Jul. 6, 2015   (JP) ................................. 2015-134883

(51) Int. Cl.
*H02K 15/04*   (2006.01)
*H02K 3/18*    (2006.01)
(Continued)

(52) U.S. Cl.
CPC ............ *H02K 15/045* (2013.01); *H02K 3/18* (2013.01); *H02K 15/0442* (2013.01);
(Continued)

(58) Field of Classification Search
CPC ............ H02K 1/148; H02K 1/16; H02K 3/12; H02K 3/18; H02K 3/46; H02K 3/47;
(Continued)

(56) References Cited

U.S. PATENT DOCUMENTS

2005/0006519 A1*   1/2005   Becherucci .......... H02K 15/095
                                                     242/433.1

FOREIGN PATENT DOCUMENTS

JP    2009-071939 A   4/2009
JP    2010-213467 A   9/2010
(Continued)

OTHER PUBLICATIONS

Machine Translation of JP 2010213467 provided by EPO website (Espacenet.com) (Year: 2019).*
(Continued)

*Primary Examiner* — Peter Dungba Vo
*Assistant Examiner* — Joshua D Anderson
(74) *Attorney, Agent, or Firm* — Sughrue Mion, PLLC

(57) ABSTRACT

There is configured a coil unit arrangement device that forms an array coil group by arranging in a predetermined arrangement order each relevant coil of a coil unit in which a plurality of coils corresponding to a plurality of phases is connected by a jumper wire for each phase, the coil unit arrangement device including: a holding section provided with a rotatable coil unit support that supports the coil unit; and a receiving section provided with an array coil group support that supports the array coil group, the receiving section relatively turning with respect to the holding section.

4 Claims, 29 Drawing Sheets

(51) Int. Cl.
    *H02K 1/14*    (2006.01)
    *H02K 1/16*    (2006.01)
    *H02K 3/12*    (2006.01)

(52) U.S. Cl.
    CPC ............... *H02K 1/148* (2013.01); *H02K 1/16* (2013.01); *H02K 3/12* (2013.01); *Y10T 29/49009* (2015.01); *Y10T 29/49073* (2015.01)

(58) Field of Classification Search
    CPC ............ H02K 3/48; H02K 3/50; H02K 3/505; H02K 3/52; H02K 3/521; H02K 3/522; H02K 3/524; H02K 3/525; H02K 3/527; H02K 3/528; H02K 15/04; H02K 15/0435; H02K 15/0442; H02K 15/045; H02K 15/062; H02K 15/063; H02K 15/065; H02K 15/085; H02K 15/095; Y10T 29/49009; Y10T 29/49073
    See application file for complete search history.

(56) References Cited

FOREIGN PATENT DOCUMENTS

| | | |
|---|---|---|
| JP | 2011-259537 A | 12/2011 |
| JP | 2012-019575 A | 1/2012 |
| JP | 5304058 A | 10/2013 |
| JP | 2016063663 A | 4/2016 |

OTHER PUBLICATIONS

Communication dated May 7, 2018, issued by the European Patent Office in corresponding European Application No. 16821288.4.
International Search Report for PCT/JP2016/069233 dated Sep. 20, 2016.

* cited by examiner

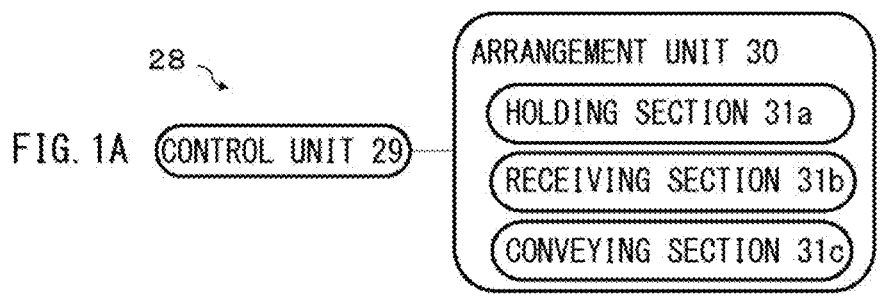
FIG. 1A
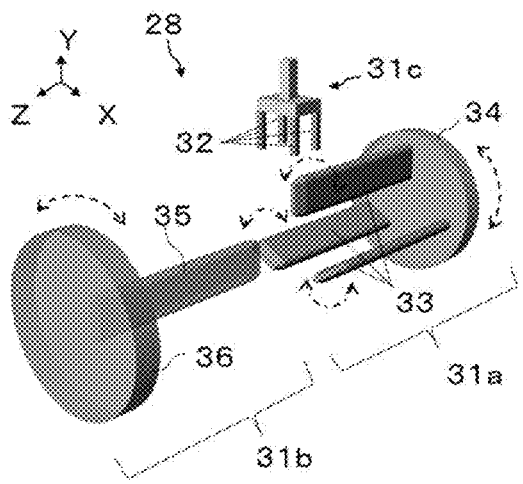
FIG. 1B
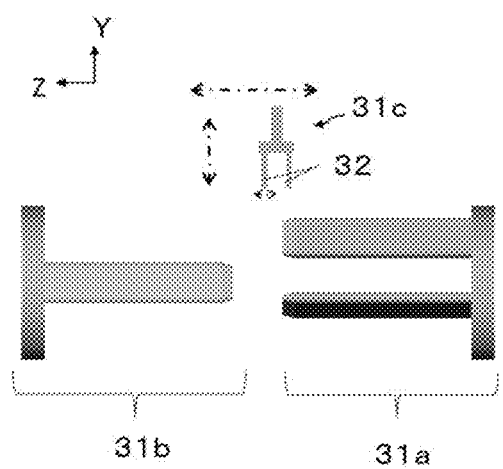
FIG. 1C
FIG. 2
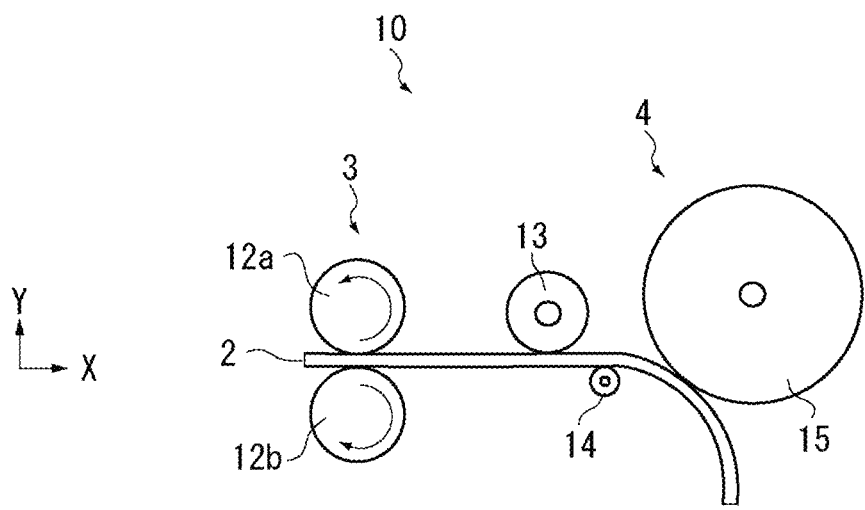

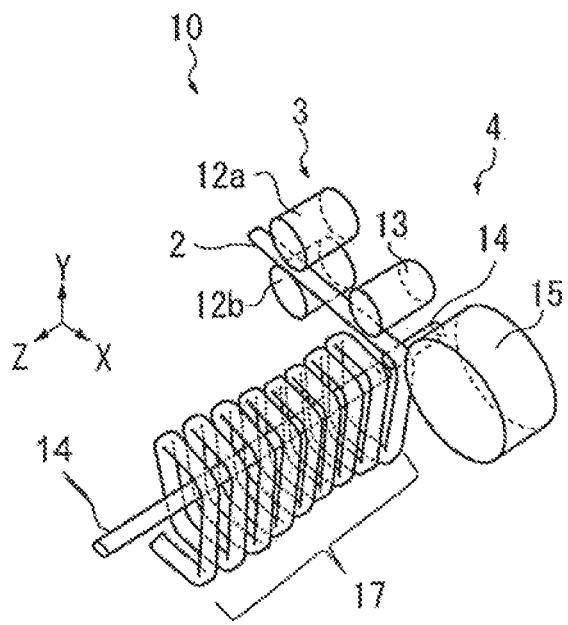
FIG. 3A
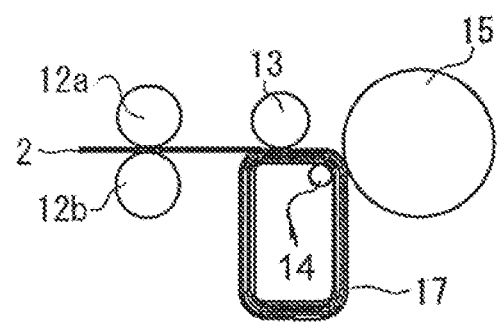
FIG. 3B
FIG. 4
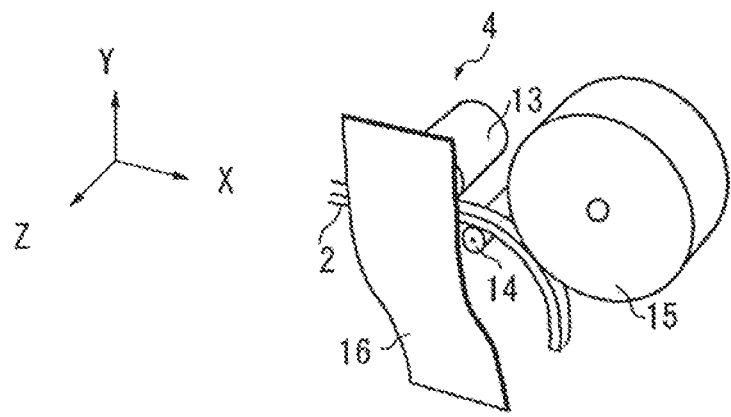

TURN ANGLE OF TURN TABLE 34
    0 DEGREE             90 DEGREES          120 DEGREES

ROTATION ANGLE OF COIL UNIT SUPPORT 33
    0 DEGREE            −180 DEGREES      −240 DEGREES

APPARENT ROTATION ANGLE OF COIL UNIT SUPPORT 33
    0 DEGREE            −90 DEGREES       −120 DEGREES

FIG. 17
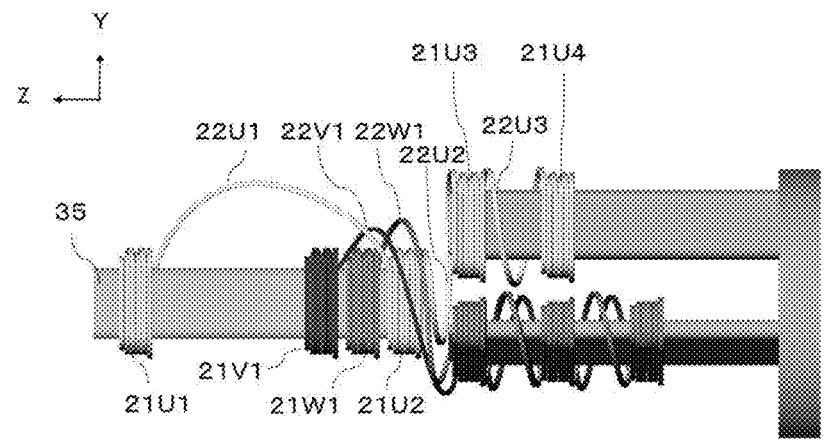
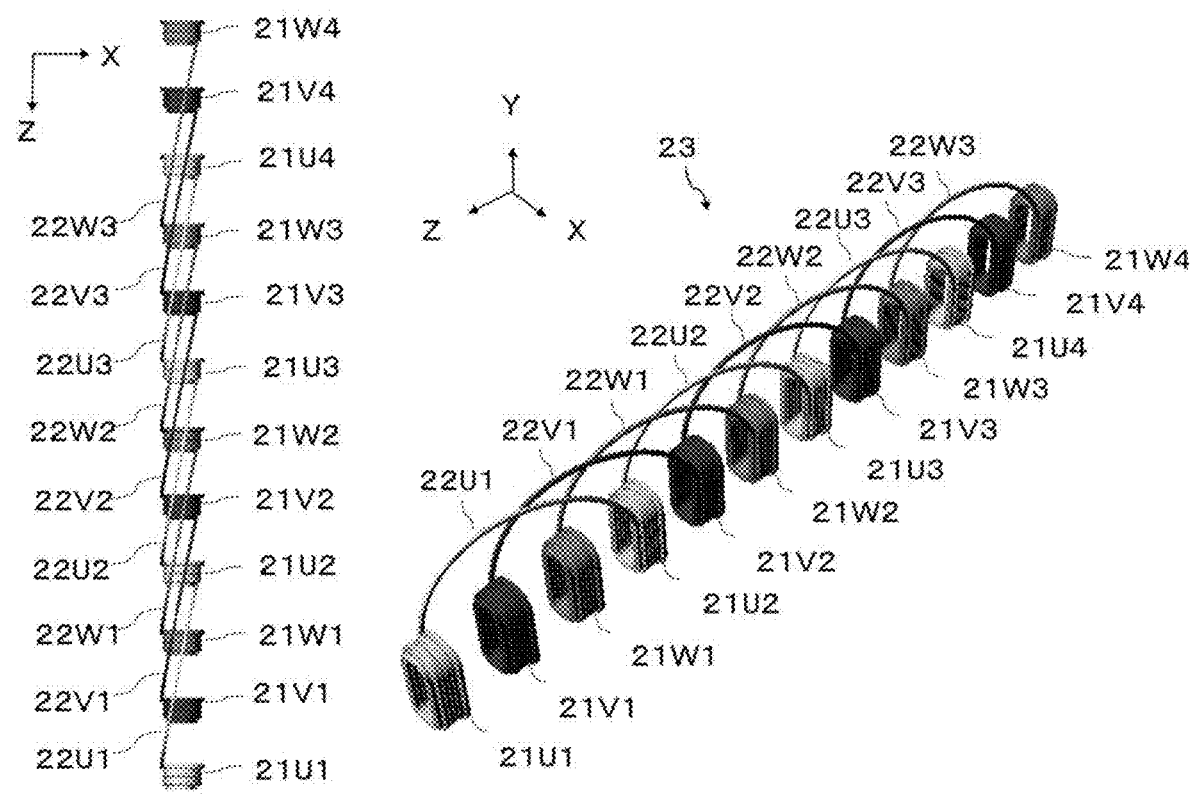
FIG. 18A
FIG. 18B

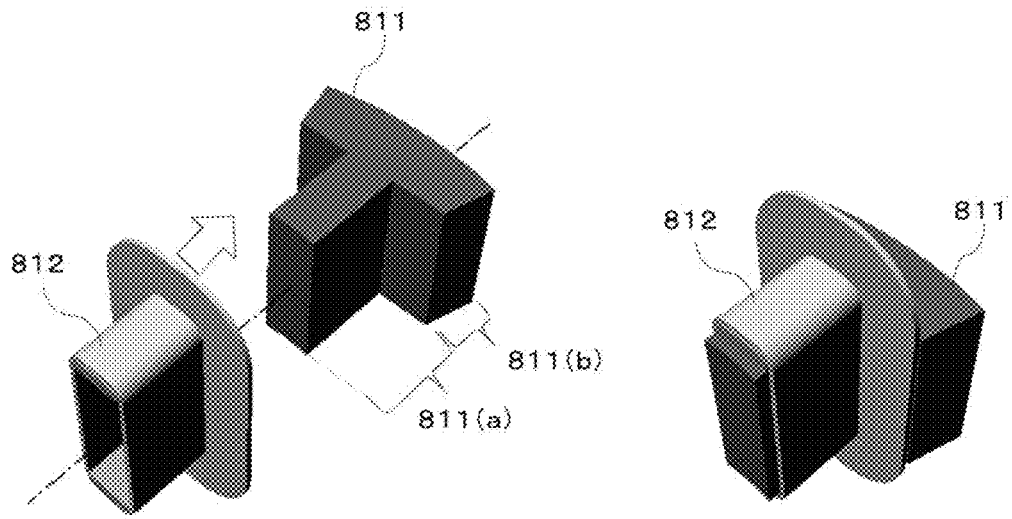
FIG. 19A    FIG. 19B
FIG. 20
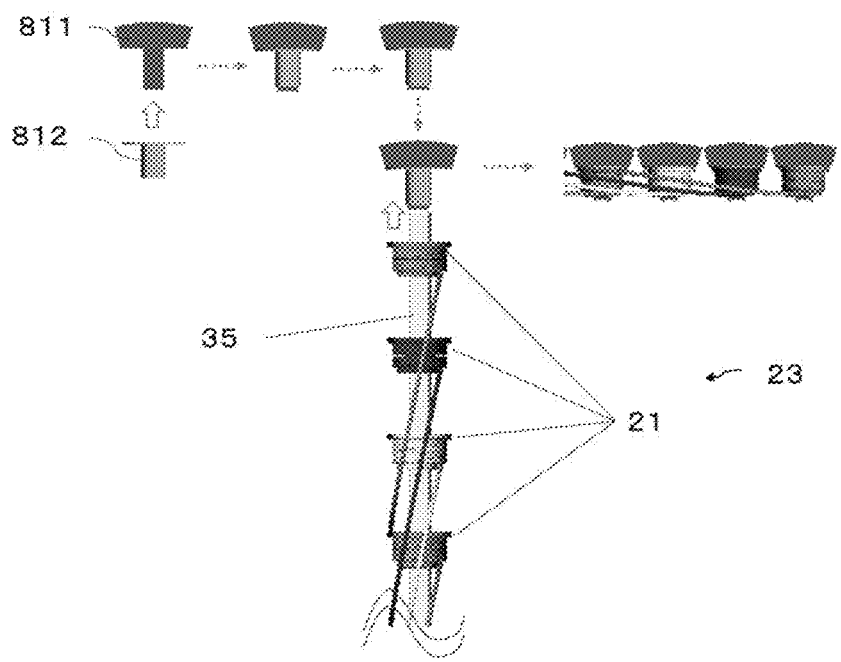

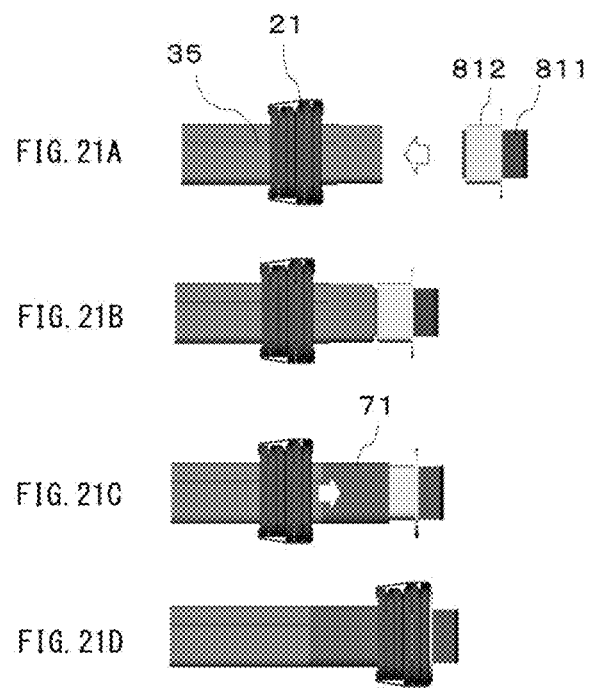
FIG. 21A
FIG. 21B
FIG. 21C
FIG. 21D
FIG. 22
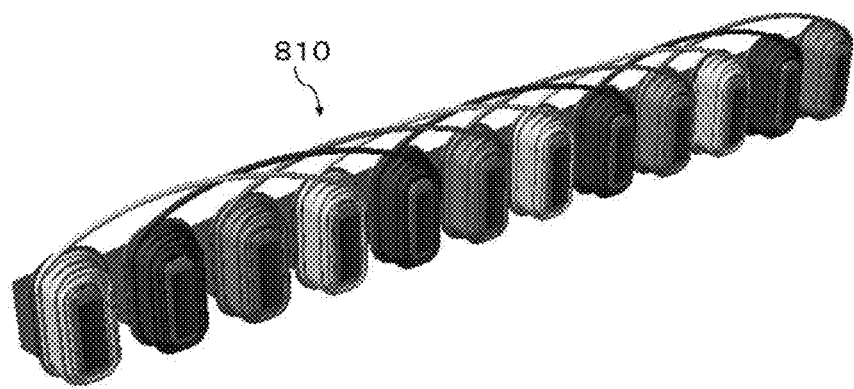

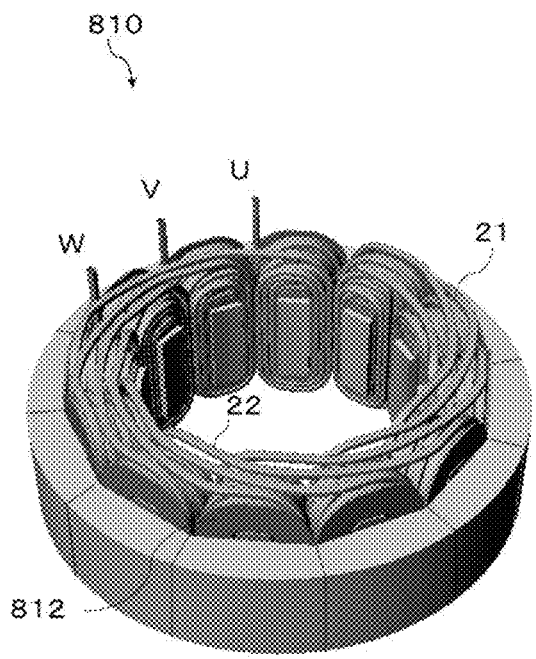
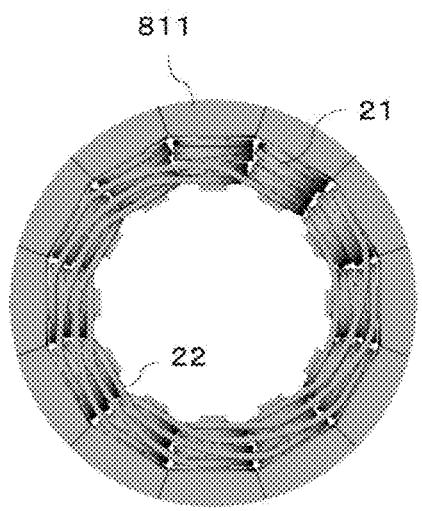
FIG. 23A  FIG. 23B
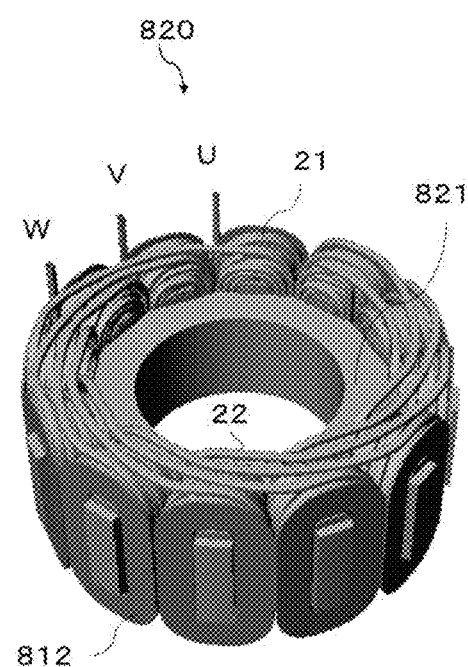
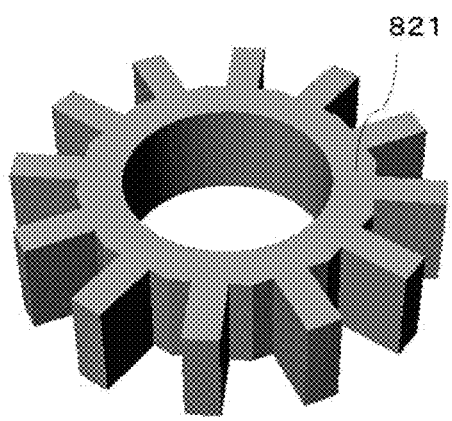
FIG. 24A  FIG. 24B TURN ANGLE OF TURN TABLE 34
  0 DEGREE            90 DEGREES            120 DEGREES ROTATION ANGLE OF COIL UNIT SUPPORT 33
  0 DEGREE            −135 DEGREES          −180 DEGREES APPARENT ROTATION ANGLE OF COIL UNIT SUPPORT 33
  0 DEGREE            −45 DEGREES           −60 DEGREES

TURN TABLE 34
TURN ANGLE: 0 DEGREE
INITIAL STATE

TURN TABLE 34
TURN ANGLE: 240 DEGREES

TURN TABLE 34
TURN ANGLE: 360 DEGREES

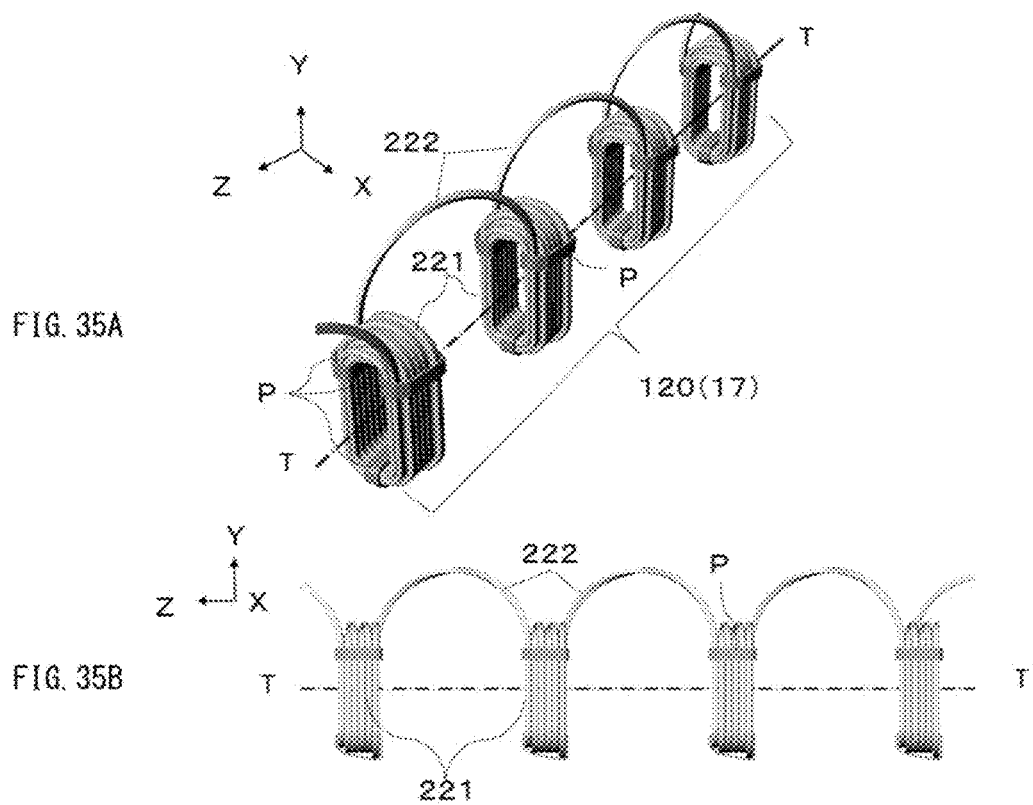
FIG. 35A
FIG. 35B
FIG. 36
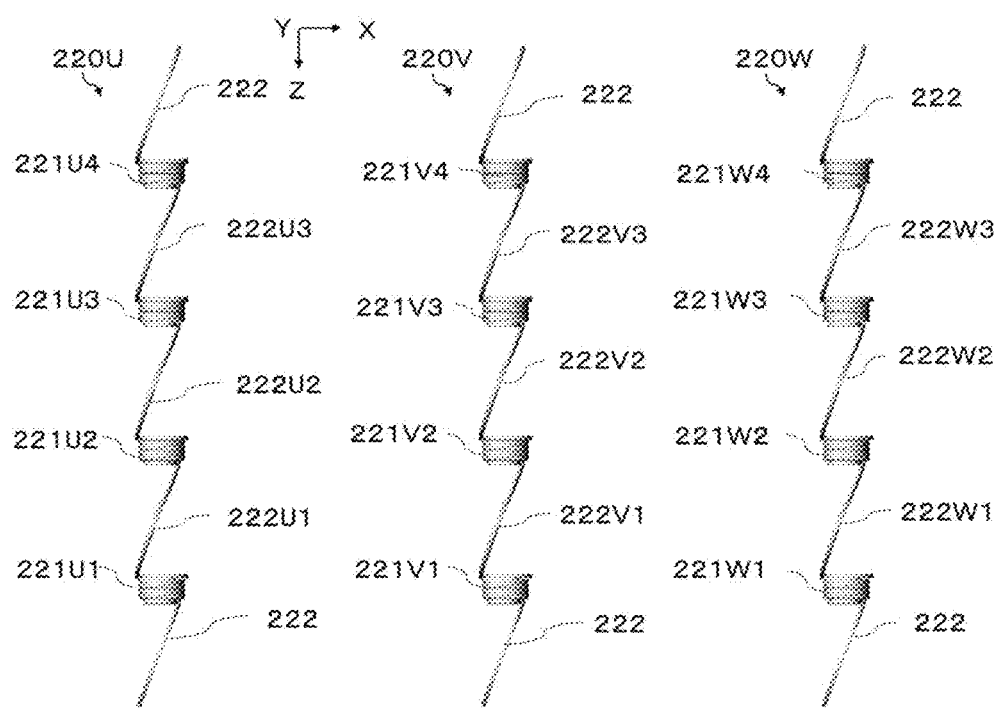

TURN ANGLE OF TURN TABLE 34
    0 DEGREE                  90 DEGREES              120 DEGREES

ROTATION ANGLE OF COIL UNIT SUPPORT 33
    0 DEGREE                 -90 DEGREES           -120 DEGREES

APPARENT ROTATION ANGLE OF COIL UNIT SUPPORT 33
    0 DEGREE                   0 DEGREE               0 DEGREE

TURN TABLE 34
TURN ANGLE: 0 DEGREE

TURN TABLE 34
TURN ANGLE:240 DEGREES
NORMAL BEFORE INSERTING COIL

TURN TABLE 34
TURN ANGLE:240 DEGREES
NORMAL BEFORE INSERTING COIL

TURN TABLE 34
TURN ANGLE: 240 DEGREES
NORMAL AFTER INSERTING COIL

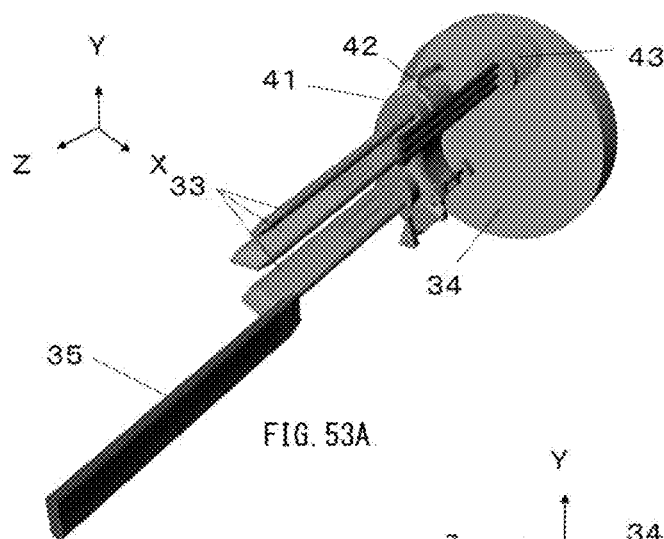
FIG. 53A
FIG. 53B
FIG. 53C
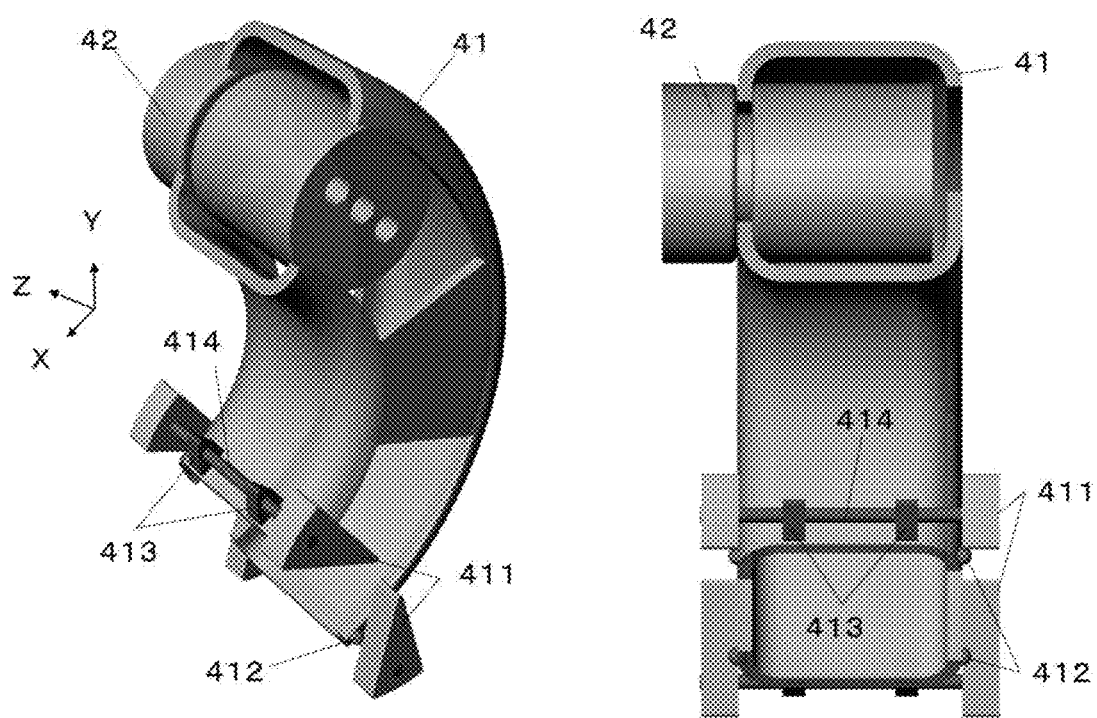
FIG. 54A
FIG. 54B

COIL UNIT ARRANGEMENT DEVICE

CROSS REFERENCE TO RELATED APPLICATIONS

This application is a National Stage of International Application No. PCT/JP2016/069233 filed Jun. 29, 2016, claiming priority based on Japanese Patent Application No. 2015-134883 filed Jul. 6, 2015, the contents of all of which are incorporated herein by reference in their entirety.

TECHNICAL FIELD

The present invention relates to a coil unit arrangement device which is used in a step of arranging a coil unit in a predetermined arrangement state among the steps of manufacturing a rotating equipment using a required number of phases of coil units, each coil unit including a plurality of coils and jumper wires.

BACKGROUND ART

A decrease in size and an increase in output power are required for electric car and hybrid car motors. An improvement in the performances is expected by using a multiple-winding coil, in which a plurality of coils of one phase is formed from one coil raw wire, in order to suppress an increase of the electric resistance associated with the wire connection process between coils. The conventional techniques for the multiple-winding coil manufacturing method and manufacturing apparatus are disclosed in Patent Literature 1, Patent Literature 2, and Patent Literature 3.

Patent Literature 1 discloses the techniques about a coil, a slotless-motor, and a method for manufacturing the coil.

Specifically, there is disclosed a coil manufacturing method comprising the steps of: using a bending machine including a fixture for fixing a conducting wire and a press tool for pressing a conducting wire in a direction perpendicular thereto; causing a conducting wire, which is a raw material, to protrude by a predetermined length and fixing the base thereof with the fixture, and in this state, pressing a protruding portion of the conducting wire in a direction perpendicular thereto on a flat plane with the press tool and bending this conducting wire at a right angle; and after the above-described steps, sequentially repeating the operations to cause the conducting wire to protrude by a predetermined length from the fixture and bend the same at a right angle, thereby forming a spiral body having a square shape.

Patent Literature 2 discloses a technique about the method for manufacturing a salient pole concentrated-winding stator of an electric motor.

Specifically, there is disclosed a method for manufacturing a stator, the method comprising the step of arranging three-phases of coil groups 18 including a plurality of coils 13 around each of which the same winding wire 14 is wound via a jumper part 14T and which are arranged stepwise so that their height levels gradually decrease from a first layer L1 to an n-th layer Ln, so that the arrangement orders of three phases in each layer are coincident with one another, the method further comprising the step of inserting the coil group into a teeth 11b of a stator core 11 while aligning all the coils 13 in line by repeating, until all the coils are brought to the same level, a work to displace the coil, while bypassing the jumper part 14T for another phase, so as to bring its height to the same height as a reference layer, in the order from the coil 13 closer to the reference layer which is either one of the layers.

Patent Literature 3 discloses a method for manufacturing a concentrated-winding stator and the technique about this manufacturing method.

Specifically, there is disclosed a method for manufacturing a coil, the method comprising the steps of: forming a coil unit by continuously forming a plurality of concentrated-winding parts with the same conductive wire; rotating the coil unit of a predetermined phase once for each concentrated-winding part of the coil unit of another phase and arranging the concentrated-winding part of the coil unit of the predetermined phase in the concentrated-winding part of the coil unit of the other phase; by repeating the above-described steps, aligning the concentrated-winding part of the coil unit of each phase in accordance with an arrangement order with respect to a stator; and fitting a teeth part of the stator into the concentrated-winding parts of the coil unit group which is formed by aligning and arranging the coil units of all phases.

CITATION LIST

Patent Literature

PTL 1: Japanese Patent Laid-Open No. 2009-71939
PTL 2: Japanese Patent Laid-Open No. 2012-19575
PTL 3: Japanese Patent No. 5304058

SUMMARY OF INVENTION

Technical Problem

However, Patent Literature 1 to Patent Literature 3 have the problems to be explained below.

In Patent Literature 1, a wire (conducting wire) is caused to protrude by a predetermined length, and is pressed by a press tool in a state where the wire is fixed with a fixture, and the wire is bent so as to follow a guide 22 having a round peripheral surface.

As the forming proceeds, the amount of formed wire constituting a coil, for which the forming has already been completed, increases. Therefore, in a step of feeding a wire by a predetermined length and/or a step of bending the same, there is a need to subject the formed wire to parallel displacement or rotational movement corresponding to each step while holding the formed wire. Thus, there is a need to secure a sufficient space so that the formed wire will not interfere with the apparatus etc. as the number of coils of the same phase increases.

In Patent Literature 2, a work is required to bypass and move the jumper wire of another phase in a state where the positional relationship between un-arranged coils of a predetermined phase is fixed. That is, a "relative movement of the central axis of the coil unit of each phase" is required to get over the un-arranged coil of the coil unit of another phase in a state where the positional relationship between un-arranged coils of a coil unit of a predetermined phase is fixed.

In this arrangement work, the moving work becomes more complicated and difficult as the number of coils inside a coil unit increases.

In Patent Literature 3, a plurality of phases of coil units is formed, and a coil unit of a predetermined phase is rotated once for each concentrated-winding part of a coil unit of another phase, so that the concentrated-winding part of the coil unit of the predetermined phase is arranged between the concentrated-winding parts of the coil units of other phases.

In this method, unless the operation of a concentrated-winding part of a predetermined phase is unified, torsion is caused in the jumper wire. Moreover, interference between a jumper wire of a coil unit of a predetermined phase and a jumper wire of a coil unit of another phase is generated during the progressing motion. Therefore, the work becomes more complicated and difficult as the number of coils inside a coil unit increases, as compared with Patent Literature 2.

Then, the present invention has been made in order to solve such problems, and provides a coil unit arrangement device capable of making compact the forming space in forming a plurality of coils from the same conducting wire and also capable of making simple and efficient the subsequent arrangement work to arrange the coils of a predetermined number of phases of coil units in a motor arrangement order so as not to cause the crossing of jumper wires.

Solution to Problem (1) A coil unit arrangement device that forms an array coil group by arranging in a predetermined arrangement order each relevant coil of a coil unit in which a plurality of coils corresponding to a plurality of phases is connected by a jumper wire for each phase, the coil unit arrangement device comprising: a holding section provided with a rotatable coil unit support that supports the coil unit; and a receiving section provided with an array coil group support that supports the array coil group, the receiving section relatively turning with respect to the holding section.

(2) The coil unit arrangement device according to (1), further comprising a conveying section configured to convey a coil of a coil unit supported by the coil unit support to the array coil group support.

(3) The coil unit arrangement device according to (2), further comprising a control unit configured to control, in forming the array coil group by extracting and arranging the coil from the coil unit on the basis of the arrangement order, the holding section, the receiving section, and the conveying section so that the jumper wire between the array coil group and a coil to be extracted is arranged on the same side of the jumper wire between the array coil group and another of the coil unit.

(4) The coil unit arrangement device according to any of (1) to (3), wherein the coil unit support is constituted by combining a divided support.

(5) The coil unit arrangement device according to any of (1) to (4), wherein the array coil group support is constituted by combining a divided support.

(6) The coil unit arrangement device according to any of (2) to (5), wherein the coil unit support and the array coil group support each include a through-hole, and the conveying section includes a removable guide bar that extends through the through-hole; and the coil is conveyed while connecting the coil unit support and the array coil group support with the guide bar.

Advantageous Effects of Invention

The coil unit arrangement device of the present invention having such characteristics exhibits the following operations and effects. Since a coil is extracted and arranged, on the basis of an arrangement order of stators, from a coil unit for each phase having a plurality of coils and jumper wires sequentially arranged therein, stators of various arrangement orders can be handled.

Moreover, since a coil is extracted once from a coil unit and then arranged, the coil can be reliably arranged in an arrangement order of stators by repeatedly performing the same arrangement process even if the number of coils increases.

Since in extracting and arranging a coil, a coil unit, from which a coil is extracted, is arranged with respect to another coil unit so that a jumper wire between an array coil group and a coil to be extracted is arranged on the same side of a jumper wire between an array coil group and another coil unit, a coil can be added to and arranged in an array coil group without crossing the jumper wires.

Moreover, since jumper wires are prevented from crossing each other by rearranging coil units, the process for adding a coil to be extracted to an array coil group can be simplified and the working efficiency can be increased.

Conventionally, in forming a coil unit including a plurality of coils and jumper wires formed from one conductor, a formed coil unit needs to be rotated in accordance with a forming process. A work space needs to be secured by the maximum length of a coil unit from a rotary shaft around which a formed coil unit rotates. According to the present invention, a work space can be made compact because a formed coil proceeds in a rotary shaft direction.

Moreover, in order to arrange a required number of phases of coil units without the jumper wires of respective phases intersecting each other, conventionally for each coil inside a coil unit of a predetermined phase, a central axis of a coil unit of a predetermined phase needs to be relatively moved with respect to a central axis of a coil unit of another phase. According to the present invention, an array coil group can also be obtained in which coils are arranged in accordance with an arrangement order with respect to a rotary electric machine without relatively moving the central axis of a coil unit. Thus, it is possible to simplify the device and also significantly improve the working efficiency.

BRIEF DESCRIPTION OF DRAWINGS

FIG. 1A to FIG. 1C illustrate a block diagram, perspective view, and YZ plan view of a coil unit arrangement device according to the present invention respectively.

FIG. 2 is an XY plan view of a forming section configured to form a coil.

FIG. 3A and FIG. 3B illustrate a perspective view and XY plan view of the forming section during forming respectively.

FIG. 4 is a perspective view of the forming section provided with a guide.

FIG. 17 is a YZ plan view after arranging a coil at the turn angles 360 degrees of the turn table of the holding section of the first embodiment according to the present invention.

FIG. 18A and FIG. 18B illustrate a ZX plan view and perspective view of an array coil group after arrangement by a coil unit arrangement device according to the present invention respectively.

FIG. 19A and FIG. 19B are a perspective view illustrating a divided stator core and an insulator respectively.

FIG. 20 is an entire schematic diagram of a fitting step which is the post processing for an array coil group.

FIG. 21A to FIG. 21D are schematic diagrams of the fitting step.

FIG. 22 is a perspective view of a linearly arranged stator after the fitting step.

FIG. 23A and FIG. 23B illustrate a perspective view and plan view of a stator used for an inner rotor respectively.

FIG. 24A and FIG. 24B illustrate perspective views of a stator used for an outer rotor.

FIG. 35A and FIG. 35B illustrate a perspective view and YZ plan view of a coil unit to be arranged, related to an alternative arrangement step 2 of the first embodiment respectively.

FIG. 36 is a ZX plan view of the coil unit to be arranged, related to the alternative arrangement step 2 of the first embodiment.

FIG. 53A to FIG. 53C illustrate a perspective view, YZ plan view, and XY plan view of an arrangement unit of a fourth embodiment according to the present invention respectively.

FIG. 54A and FIG. 54B illustrate perspective views of a holding body and coupling of the fourth embodiment according to the present invention.

DESCRIPTION OF EMBODIMENTS

Figure 5:
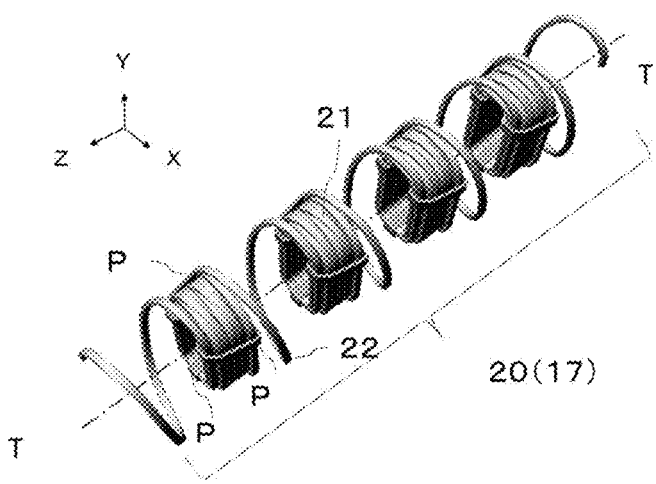
FIG. 5 is a perspective view of a coil unit.

Hereinafter, embodiments of a coil unit arrangement device according to the present invention will be explained in detail, with the manufacture of a three-phase/twelve-core stator taken as an example. Note that, since the embodiments to be explained hereinafter are the preferable specific examples in implementing the present invention, various restrictions are technically set, but the present invention is not limited to these embodiments unless otherwise specifically stated in the description below that the present invention is limited particularly.

First Embodiment

A coil unit arrangement device 28 of a first embodiment will be explained with reference to FIG. 1 to FIG. 25. FIG. 1A to FIG. 1C illustrate a block diagram, perspective view, and YZ plan view of the coil unit arrangement device respectively.

The coil unit arrangement device 28 includes a control unit 29 and an arrangement unit 30.

The arrangement unit 30 includes: a holding section 31a provided with a rotatable coil unit support 33 that supports a coil unit; a receiving section 31b including an array coil group support 35 for supporting an array coil group and relatively turning with respect to the holding section; and a conveying section 31c configured to convey a coil of a coil unit supported by the coil unit support 33 to the array coil group support 35.

The control unit 29 controls, in forming the array coil group by extracting and arranging a coil from the coil unit on the basis of an arrangement order, the operations of the holding section 31a, receiving section 31b, and conveying section 31c so that a jumper wire between the array coil group and the coil to be extracted is arranged on the same side of the jumper wire between the array coil group and another coil unit.

The holding section 31a includes a required number of phases of the coil unit supports 33 and a turn table 34 to which the coil unit supports 33 are connected. The coil unit supports 33 are each capable of rotating.

The receiving section 31b is arranged opposite to the holding section 31a, and includes the array coil group support 35 and a turn table 36 to which the array coil group support 35 is connected. As with the holding section 31a, the array coil group support 35 is capable of rotating. Moreover, the connection portion between the array coil group support 35 and the turn table 36 is adjustable in the radial direction of the turn table 36.

The array coil group support 35 and coil unit support 33 have a gap in the Z-direction so that a jumper wire 22 can pass therethrough.

The axis directions of the rotation and turn of the coil unit support 33, array coil group support 35, and turn tables 34, 36 are the Z-directions. In this example, the Z-direction generally coincides with a central axis TT of the coil described later.

As described above, at least either one of the turn table 34 and the turn table 36 turns so that the holding section 31a and the receiving section 31b relatively turn to each other. The coil unit support 33 of the holding section 31a and the array coil group support 35 are capable of rotating in a given rotation direction and at a given rotation speed.

The holding section 31a can be configured, for example, by fixing the internal-tooth gear of a planetary gear and using the rotation of a planetary gear carrier as the turn of the turn table 34 and using the rotation of a planetary gear as the rotation of the coil unit support 33. Other than this, the coil unit support 33 and the turn table 34 may be each driven by an independent motor.

The conveying section 31c includes a plurality of pawls 32 for grabbing a coil, and at least one of the pawls 32 is capable of adjusting an interval to the other pawls 32. Moreover, as indicated by dashed-dotted line arrows of FIG. 1C, the conveying section 31c includes a mechanism movable in two directions, i.e., the Y-direction and the Z-direction. Thus, the conveying section 31c can grab a coil supported by the coil unit support 33 of the holding section 31a and can convey the same to the array coil group support 35 of the receiving section 31b. Moreover, the conveying section 31c can feed a coil, which is fitted into the array coil group support 35, in the Z-direction as needed. Although only one conveying section 31c is illustrated in FIG. 1C, two or more are desirably provided.

Other than this, for example, a articulated robot may constitute the conveying section 31c.

Hereinafter, an arrangement process by the coil unit arrangement device of the first embodiment will be explained. First, as an example of a coil unit to be arranged, FIG. 2 to FIG. 6 illustrate a coil unit of an air-core coil and a step of forming the coil unit.

In a step of forming an air-core coil, a coil wire is bent so as to be in a design shape by a forming unit. A forming unit 10 includes a feed section 3 and a deformation section 4 as illustrated in FIG. 2. The feed section 3 includes a drive roll 12a and a driven roll 12b arranged opposite to the drive roll 12a. The feed section 3 rotationally drives the drive roll 12a while pinching a coil wire 2 between the drive roll 12a and the drive roll 12b and thereby feeds out the coil wire 2 from a non-illustrated supply section and conveys the same to the deformation section 4 while shaping the same so as to be linear in the longitudinal direction.

The deformation section 4 includes a press roll 13, a support roll 14, and a push roll 15. The support roll 14 is arranged on one side of a conveying path of the coil wire 2, while the push roll 15 is arranged on the other side of the conveying path of the coil wire 2 and configured to move in a direction intersecting the conveying path. Then, a push operation to press the coil wire 2 performed by the push roll 15 deforms the coil wire 2 into a desired curvature.

As illustrated in FIG. 3A and FIG. 3B, the coil wire 2 having passed through the deformation section 4 results in a compact 17. In order to prevent interference between the compact 17 and each roll, a guide 16 is desirably installed as needed as illustrated in FIG. 4. The compact 17 spirally proceeds in the Z-axis direction while being guided by the guide 16 (in the perspective view of FIG. 2, a spiral shape is emphasized and drawn).

Using the above-described forming unit, forming is performed so that the compact 17 forms a coil unit 20 having a predetermined number of coils 21 and jumper wires 22 sequentially arranged therein. In order to prevent the coil 21 from expanding in a central-axis TT direction and also prevent the coil wire 2 in a vicinity of the jumper wire 22, the coil wire 2 constituting the coil 21, from deforming, it is desirable to restrain at least two or more places of the coil part 21 with a tacking tape P.

As illustrated in FIG. 5, in the case of a three-phase/ twelve-core stator, the coil unit 20 is constituted from four concentrated-winding coils 21 and five jumper wires 22. The coil 21 is a multilayer a-turn coil having a linear part and a curved part alternately formed therein.

The jumper wire 22 of a coil unit is formed so as to revolve around the central axis TT of the coil 21. The jumper wire 22 is designed so as to have a length which is required to connect the coils 21 of the same phase when the coils 21 are disposed in a motor. Moreover, in order to support and rotate the coil unit 20, the jumper wire 22 is desirably formed so as not to cross the air core part of the coil 21 so that the coil unit support 33 can extend through the central axis TT.

The desirable number of revolutions of the jumper wire 22 around the central axis TT depends on the symmetry of the inner peripheral shape of the coil 21, and is specifically an integral multiple of ½ turn when the coil 21 is substantially rectangular, while when the coil 21 is substantially square, it is an integral multiple of ¼ turn. Not limited thereto, the number of revolutions of the jumper wire 22 around the central axis TT may be arbitrarily set.

In this manner, three phases of coil units 20 are prepared. Not limited to the multilayer a-turn, the coil unit 20 may be formed by ordinary bobbin winding.

In the description about the following steps, as illustrated in FIG. 5 a case of the coil unit 20 will be explained where the jumper wire 22 revolves around the central axis TT by 360 degrees.

Figure 6:
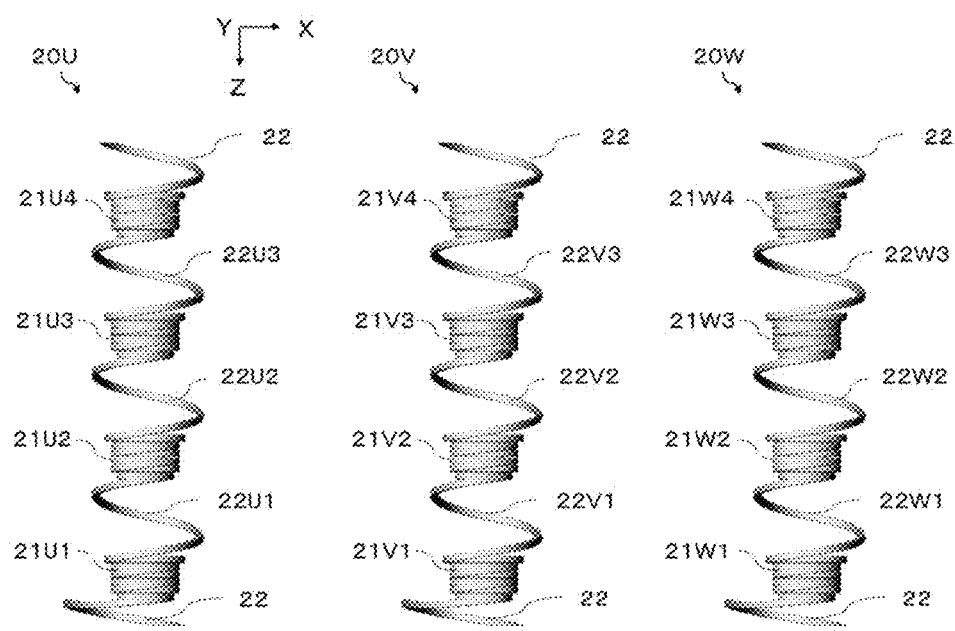
FIG. 6 is a plan view of the coil unit.

Moreover, three phases are referred to as a U-phase, a V-phase, and a W-phase, and as illustrated in FIG. 6, a coil unit of the U-phase is designated by 20U, and sequentially from the lower side of the page the coils are designated by 21U1, 21U2, 21U3, and 21U4 and the jumper wires between the coils are designated by 22U1, 22U2, and 22U3. The V-phase and the W-phase are also similarly designated.

When simply being referred to as a coil, at least one coil 21 among 21U1 to 21WU4 is referred to, or all coils 21 are referred to.

When simply being referred to as a jumper wire, at least one jumper wire 22 among 22U1 to 22WU3 is referred to, or all jumper wires 22 are referred to.

When simply being referred to as a coil unit, at least one coil unit 20 among the coil units 20 of the U-phase, V-phase, and W-phase is referred to, or all coil units 20 are referred to.

One of the jumper wires 22 at both ends of a coil unit is a constituting element required as a connection line to a power supply, while the other one is a constituting element required as a connection line to a neutral point. However, in the following figures, for simplicity the illustration of the jumper wire 22 at both ends of a coil unit is omitted.

Figure 7:
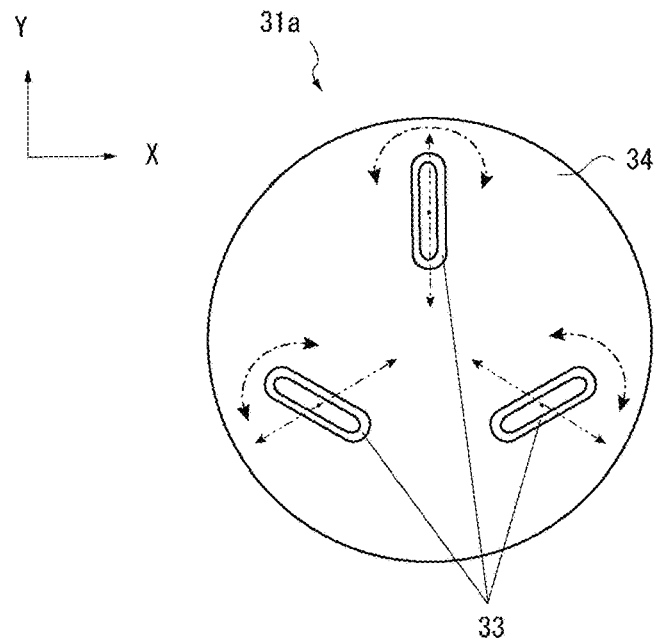
FIG. 7 is an XY plan view illustrating an outline of the movement of a coil unit support of a first embodiment according to the present invention.

Next, the operation of the coil unit arrangement device 28 of the first embodiment will be explained with reference to FIG. 7 to FIG. 17. FIG. 7 illustrates an XY plan view when the holding section 31a in an initial state is seen from the receiving section 31b.

The central axes of the coil unit supports 33 are located at the positions of 0 o'clock, 4 o'clock, and 8 o'clock, respectively, when the turn table 34 is regarded as a clock, and are generally spaced each other by 120 degrees. Moreover, if the angle of the coil unit support 33 located at the position of 0 o'clock is defined as 90 degrees, then the coil unit support 33 located at the position of 4 o'clock is connected to the turn table 34 at 30 degrees and the coil unit support 33 located at the position of 8 o'clock is connected to the turn table 34 at 150 degrees.

As illustrated by two-dotted and dashed line arrows of FIG. 7, the connection portion between the coil unit support 33 and the turn table 34 is adjustable in the radial direction of the turn table 34.

A case will be taken as an example and explained where the array coil group support 35 of the receiving section 31b and the turn table 36 are fixed and the turn table 34 is turned while rotating the coil unit support 33 of the holding section 31a. If a relative relationship is the same, then for example, the turn table 34 of the holding section 31a may be fixed while rotating the coil unit support 33 and turning the turn table 36 of the receiving section 31b.

Figure 8:
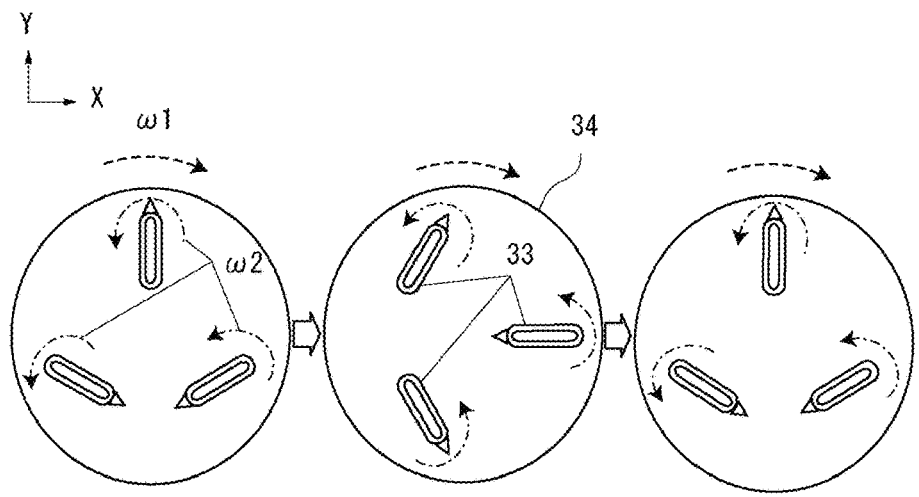
FIG. 8 is an XY plan view illustrating the movement of a holding section of the first embodiment according to the present invention.

First, the movement of only the holding section 31a will be explained. FIG. 8 illustrates change in the XY plan view when the holding section 31a in operation is seen in the Z-direction from the receiving section 31b. For ease of understanding of the operation, a triangle mark is put on the coil unit support 33. The coil unit support 33 rotates counterclockwise at a rotation speed ω2 indicated by a one-dotted and dashed line arrow, while the turn table 34 turns clockwise at a turn speed ω1 indicated by a broken line arrow. The relationship between ω1 and ω2 is set as $\omega2=-2\times\omega1$.

Therefore, when the turn table 34 turns by 90 degrees, the coil unit support 33 located at the position of 0 o'clock in an initial state will move to the position of 3 o'clock. At this time, the triangle mark comes to the center side of the turn table 34.

When the turn table 34 turns by 120 degrees, the coil unit support 33 located at the position of 0 o'clock in an initial state will come to the position of 4 o'clock and then coincides with, in angle, the coil unit support 33 located at the position of 4 o'clock in the initial state.

As explained above, every time the turn table 34 turns by 120 degrees, the position of the coil unit support 33 differs but is in the same arrangement as in the initial state. Moreover, when the turn table 34 rotates clockwise once, the coil unit support 33 rotates counterclockwise twice, but apparently rotates counterclockwise once as the result of subtracting one revolution (one turn of the turn table 34).

Figure 9:
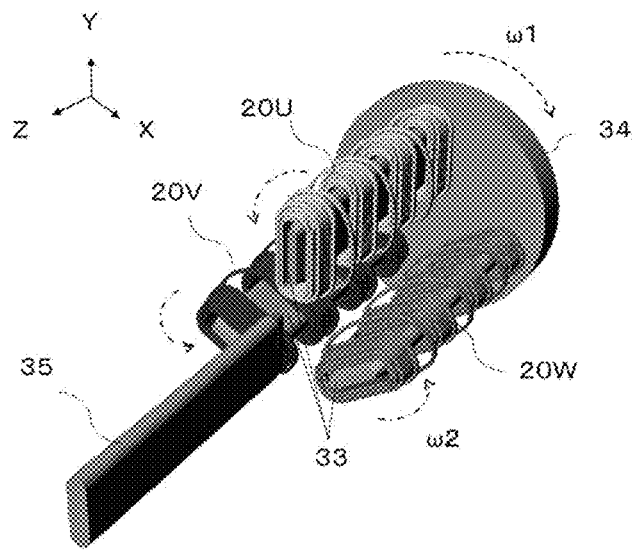
FIG. 9 is a perspective view before arranging a coil at the turn angle 0 degree of the turn table of a holding section of the first embodiment according to the present invention.

FIG. 9 illustrates an initial state in which the three-phases of coil units 20 are set to the coil unit support 33 of the holding section 31a. The coil of each phase is installed so that a coil end on the plus side in the Y-axis of FIG. 5 is located on the triangle mark side of FIG. 8, and the order of each phase is set so that the coil unit of each phase passes through the position of 0 o'clock in the order of U-phase→V-phase→W-phase, which is an arrangement order, when the turn table 34 turns clockwise.

An operation to obtain an array coil group, in which the jumper wire 22 is located on the same side of the jumper wire 22 of another phase without crossing of the jumper wires 22, will be explained with reference to FIG. 10 to FIG. 18.

Figure 10:
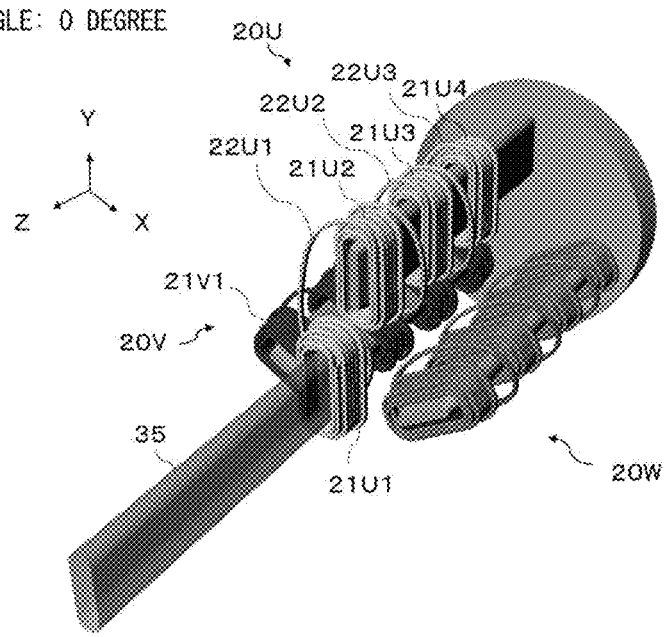
FIG. 10 is a perspective view after arranging a coil at the turn angle 0 degree of the turn table of the holding section of the first embodiment according to the present invention.
Figure 11:
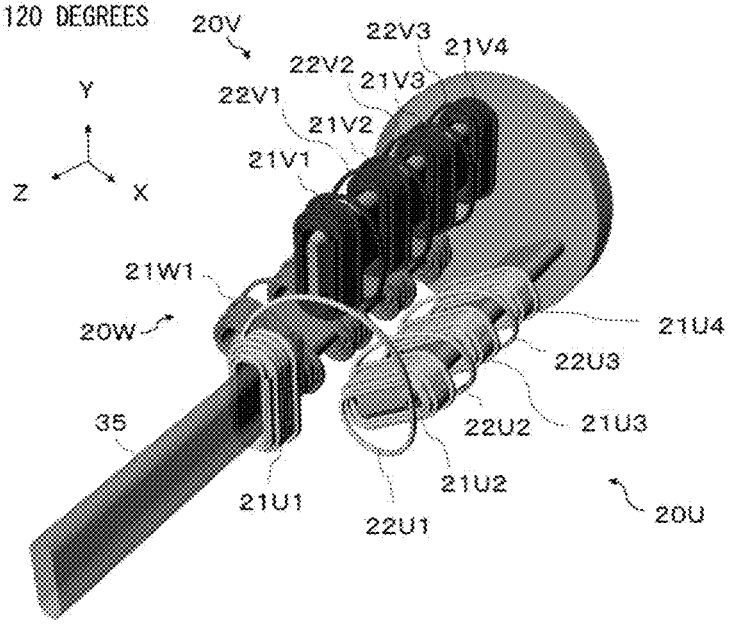
FIG. 11 is a perspective view before arranging a coil at the turn angle 120 degrees of the turn table of the holding section of the first embodiment according to the present invention.
Figure 12:
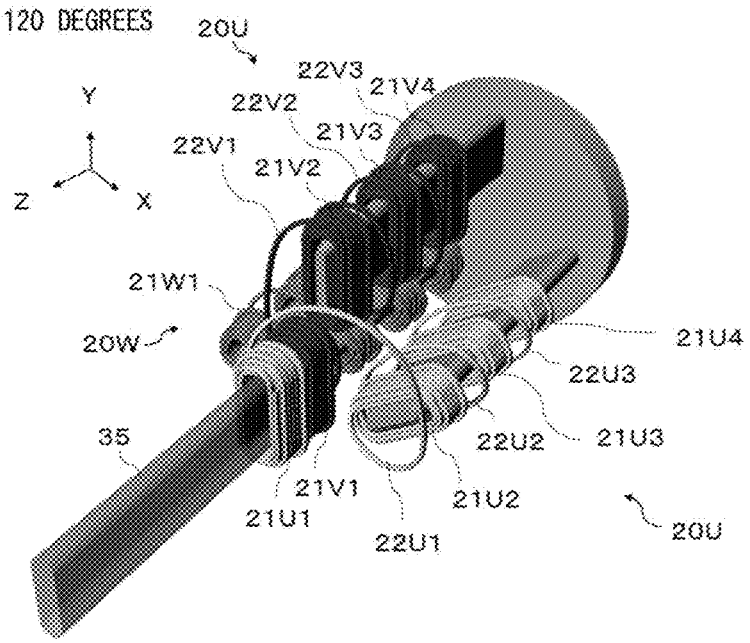
FIG. 12 is a perspective view after arranging a coil at the turn angle 120 degrees of the turn table of the holding section of the first embodiment according to the present invention.

As illustrated in FIG. 10, from the state of FIG. 9 the coil 21U1 of the coil unit 20U is fitted into the array coil group support 35 by being grabbed and conveyed by the conveying section 31c. Next, as illustrated in FIG. 11, from the state of FIG. 10 the turn table 34 is rotated clockwise by 120 degrees so as to be located at the position of the rotation-angle 120 degrees. Next, as illustrated in FIG. 12, from the state of FIG. 11 the coil 21V1 of the coil unit 20V is fitted into the array coil group support 35. At this time, the jumper wire 22U1 passes through the upper side (plus direction side of the Y-axis) of the coil 21V1 and links the coil 21U1 and the coil 21U2.

Figure 13:
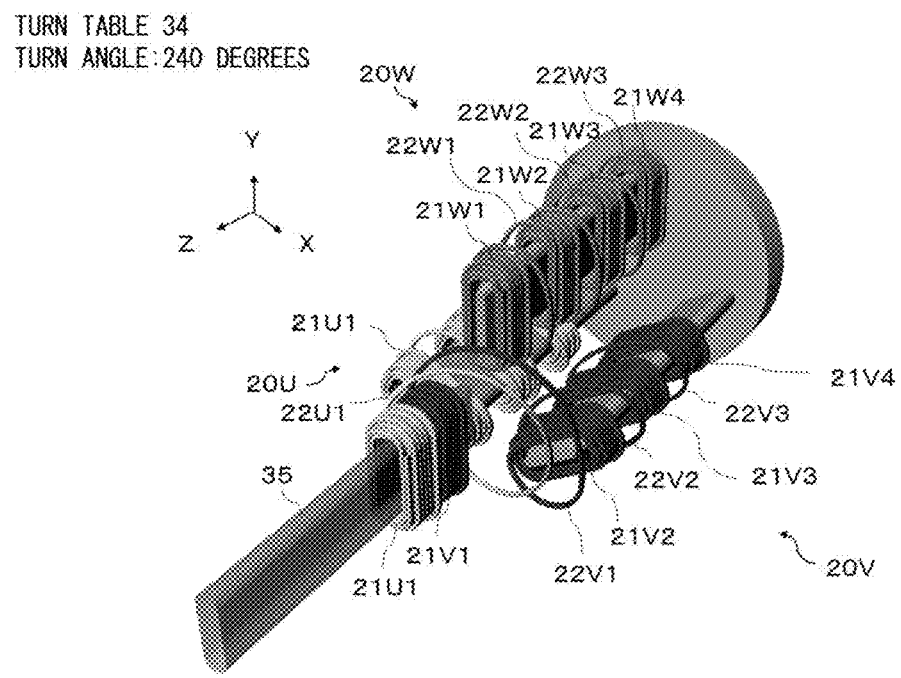
FIG. 13 is a perspective view before arranging a coil at the turn angle 240 degrees of the turn table of the holding section of the first embodiment according to the present invention.
Figure 14:
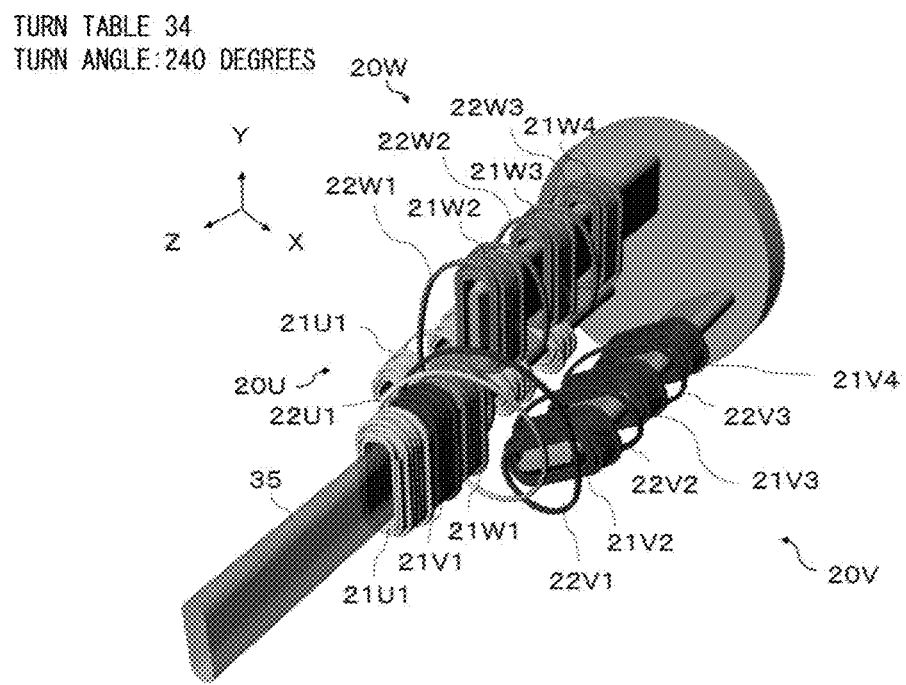
FIG. 14 is a perspective view after arranging a coil at the turn angle 240 degrees of the turn table of the holding section of the first embodiment according to the present invention.

As illustrated in FIG. 13, from the state of FIG. 12 the turn table 34 is further turned clockwise by 120 degrees so as to be located at the position of turn angle 240 degrees. Next, as illustrated in FIG. 14, from the state of FIG. 13 a coil 21W1 of a coil unit 20W is fitted into the array coil group support 35. Even if the turn table 34 turns by 120 degrees from FIG. 12, the jumper wire 22U1 is connected to the coil 21U2 via the +X side when seen from the array coil group support 35.

Figure 15:
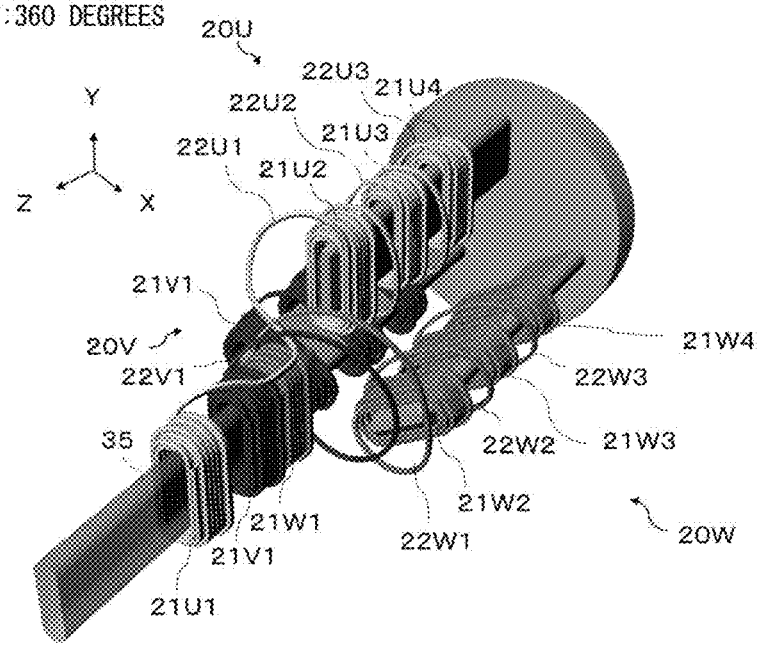
FIG. 15 is a perspective view before arranging a coil at the turn angle 360 degrees of the turn table of the holding section of the first embodiment according to the present invention.
Figure 16:
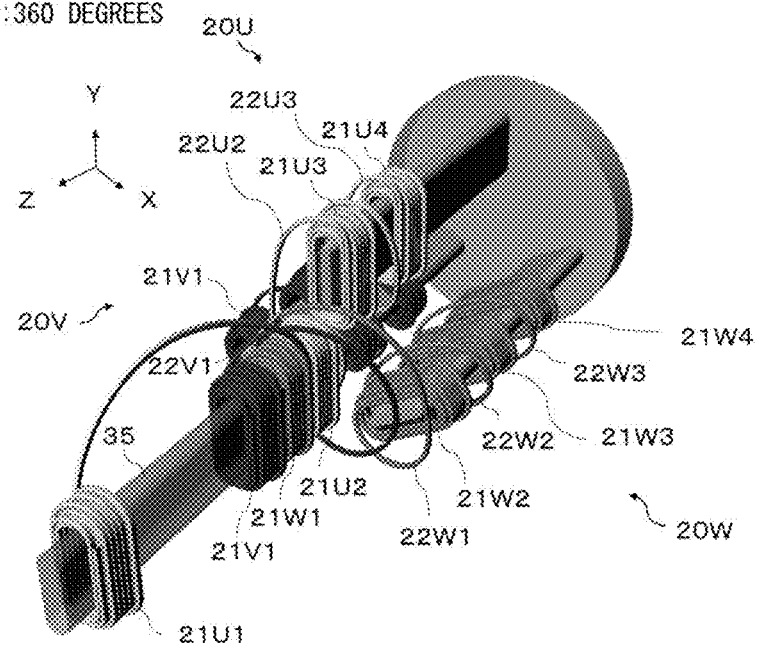
FIG. 16 is a perspective view after arranging a coil at the turn angle 360 degrees of the turn table of the holding section of the first embodiment according to the present invention.

As illustrated in FIG. 15, from the state of FIG. 14 the turn table 34 is further turned clockwise by 120 degrees so as to be located at the position of turn angle 360 degrees. Next, as illustrated in FIG. 16, from the state of FIG. 15 the coil 21U1 fitted into the array coil group support 35 is fed in the Z-direction so as to fit the coil 21U2 of the coil unit 20U into the array coil group support 35.

In the course of the turn angle of the turn table 34 changing from 240 degrees to 360 degrees, the jumper wire 22U1 passes through the −Z side of the coil 21W1 by the turn of the turn table 34 of the holding section 31a and the rotation of the coil unit support 33, and further passes through the gap in the Z-direction between the coil unit support 33 and the array coil group support 35.

As illustrated in FIG. 17, when the turn angle of the turn table 34 becomes 360 degrees, the jumper wire 22U1 gets around the minus side in the Y-direction with respect to a jumper wire 22V1 and jumper wire 22W1.

Thus, by fitting all the coils 21 into the array coil group support 35 by repeating the above-described works, an array coil group 23 illustrated in FIG. 18A and FIG. 18B is obtained. As illustrated in FIG. 18A, the jumper wire 22 of the array coil group 23 will locate on the same side with respect to the jumper wire 22 of another phase without the jumper wires 22 intersecting each other. Specifically, a jumper wire 22U(n) is located between a jumper wire 22W(n−1) and a jumper wire 22V(n), a jumper wire 22V(n) is located between a jumper wire 22U(n) and a jumper wire 22W(n), and a jumper wire 22W(n) is located between a jumper wire 22V(n) and a jumper wire 22V(n+1).

As explained above, the array coil group 23 can be obtained, in which coils are arranged in one line in an arrangement order and the jumper wire 22 is arranged on the same side with respect to the jumper wire 22 of another phase without the jumper wires 22 intersecting each other.

In the conventional technique, the central axes of a coil unit need to be relatively moved, while according to the first example, the relative positional relationship between the central axes of the coil unit support 33 is fixed. Therefore, there are merits that the structure of the device can be simplified and the operation thereof can be easily speeded up because the main movement is a rotational movement.

Next, the assembly process until the array coil group 23 obtained by the coil unit arrangement device is assembled into a rotating equipment will be explained with reference to FIG. 19 to FIG. 25.

The assembly process includes a fitting step of fitting and integrating the coils 21 into the teeth part of a stator and a disposing step of annularly disposing and fixing an integrated coil in a motor shape.

In the fitting step, the array coil group 23 obtained by the coil unit arrangement device is fitted into the teeth part of a stator of a motor via an insulating member.

FIG. 19A and FIG. 19B are perspective view of a divided stator core 811 constituting the stator of the motor having a rotor thereinside. The divided stator core 811 is formed by stacking a magnetic steel sheet formed by pressing etc., and is integrated by a part thereof being crimped or welded. Moreover, the divided stator core 811 is constituted from a teeth part 811(a), around which the coil 21 is disposed, and a yoke part 811(b). As illustrated in FIG. 19B, before disposing the coil 21 over the teeth part 811(a), an insulating member 812 is fitted on the teeth part 811(a) in advance.

FIG. 20 illustrates a schematic diagram of the fitting step. The divided stator core 811, around which the insulating member 812 is fitted, is abutted against an end face of the array coil group support 35 which extends through the air core part of the array coil group 23, and the coil 21 of the array coil group 23 is fitted into the divided stator core 811. The fitting step can be continuously performed by sliding the divided stator core having the coil 21 fitted therein, in a direction intersecting with the axis direction of the array coil group support 35 which supports the array coil group 23.

FIG. 21A to FIG. 21D focus on one coil 21 and illustrate the detail of the step of fitting the coil 21 into the divided stator core 811. As illustrated in the initial state of FIG. 21A to FIG. 21B, the divided stator core 811, around which the insulating member 812 is fitted, is abutted against the array coil group support 35 which supports the array coil group 23. Subsequently, as illustrated in FIG. 21C, a guide tape 71 is wound so that the array coil group support 35 and the divided stator core 811 are integrated and also so as to include at least a part of the insulating member 812, and then as illustrated in FIG. 21D the coil 21 is fitted into the divided stator core 811.

By repeating the above-described works, all the coils 21 of the array coil group 23 are fitted into the divided stator core 811 so as to obtain a linear stator 810 as illustrated in FIG. 22.

In the disposing step, by annually arranging the linear stator 810 obtained in the fitting step and fixing the same by a shrink-fitted ring etc., a stator as illustrated in FIG. 23 A and FIG. 23B is obtained.

Also an outer rotor type stator 820, in which a rotor is located outside, as illustrated in FIG. 24A and FIG. 24B, can be assembled by performing the fitting step while rotating a stator core 821 for each coil.

Figure 25A:
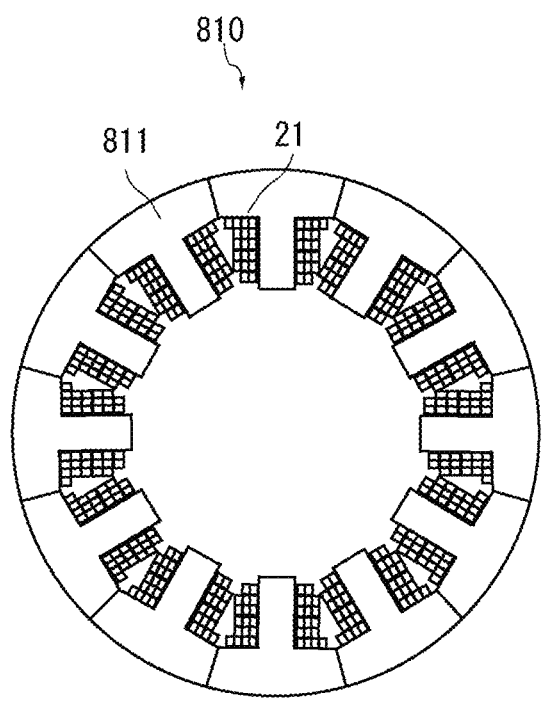
FIG. 25A and FIG. 25B are cross sectional views of the stator for an inner rotor.
Figure 25B:
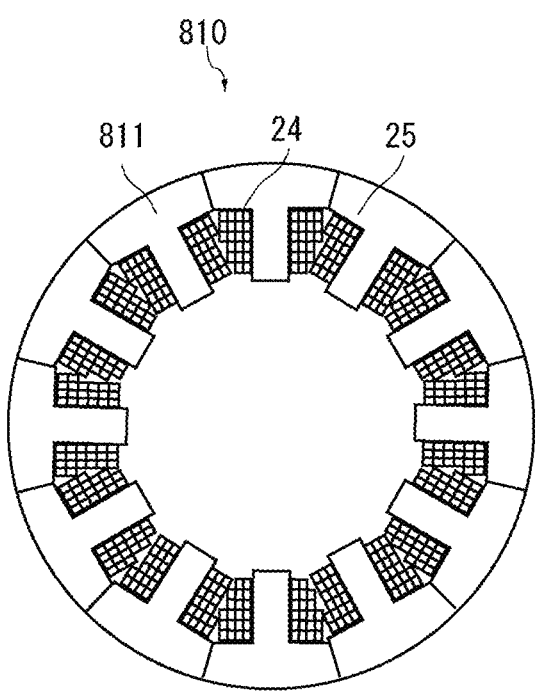

Although FIG. 25A is a cross sectional view of the stator of FIG. 23B, a space factor can be increased by alternately changing the cross sections of the adjacent coil shapes, such as coil 24→coil 25 as illustrated in FIG. 25B.

(An Alternative Arrangement Step 1 Performed by the Coil Unit Arrangement Device of the First Embodiment)

Next, an alternative arrangement step 1 performed by the coil unit arrangement device of the first embodiment will be explained with reference to FIG. 26 to FIG. 34. A coil unit to be arranged in the alternative arrangement step 1 performed by the coil unit arrangement device of the first embodiment has a configuration similar to the first embodiment except that the number of revolutions of the jumper wire around the central axis TT is a half. This configuration is effective when the length of a jumper wire is short and it is thus difficult to cause the jumper wire to revolve around the central axis TT once. Note that, since the conveying section 31c is similar to the first embodiment, the explanation thereof is omitted.

Figure 26A:
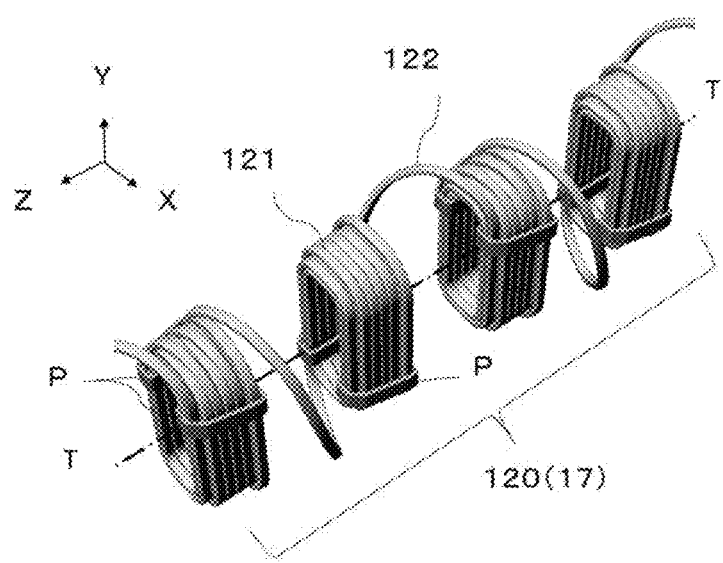
FIG. 26A and FIG. 26B illustrate a perspective view and YZ plan view of a coil unit to be arranged, related to an alternative arrangement step 1 of the first embodiment respectively.
Figure 26B:
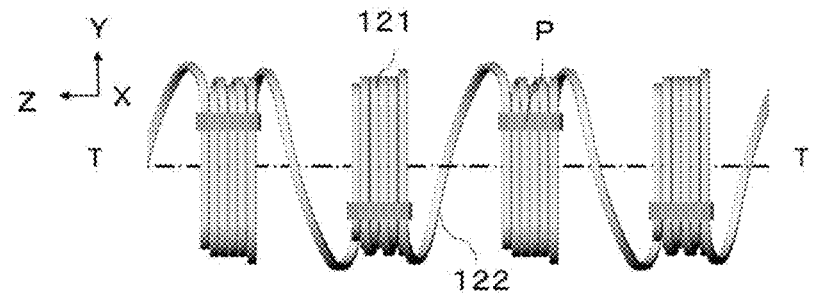

FIG. 26A and FIG. 26B illustrate a coil unit 120 used in the alternative arrangement step 1 performed by the coil unit arrangement device of the first embodiment. In the coil unit 120, four coils 121 and five jumper wires 122 each revolving around the central axis TT by 180 degrees are constituted from the coil wire 2. In the coil 121, two places in a vicinity of a place where the coil 121 and the jumper wire 122 are connected are restrained with a tacking tape P so as to prevent the coil 121 from expanding in the central-axis TT direction and also so as to prevent the coil wire 2 in the vicinity of jumper wire 122 constituting the coil 121 from deforming. The coils 121 in front of and behind the jumper wire 122 are connected by being rotated from each other by 180 degrees around the central axis TT.

Figure 27:
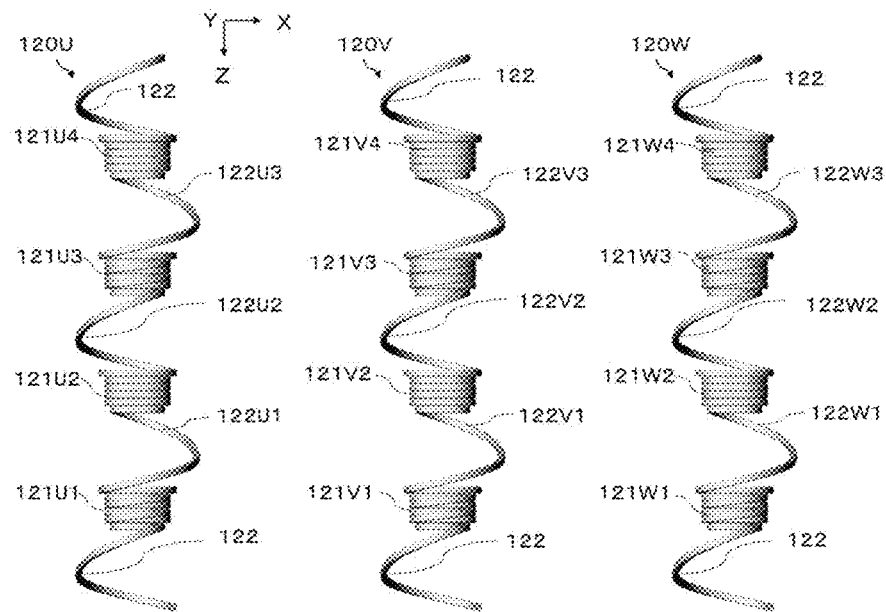
FIG. 27 is a ZX plan view of the coil unit to be arranged, related to the alternative arrangement step 1 of the first embodiment.

Three phases of coil units 120 are prepared in this manner. Moreover, three phases are referred to as a U-phase, a V-phase, and a W-phase, and as illustrated in FIG. 27, the coil unit of the U-phase is designated by 120U, and sequentially from the lower side of the page the coils of the coil unit are designated by 121U1, 121U2, 121U3, and 121U4 and the jumper wires between the coils are designated by 122U1, 122U2, and 122U3. The V-phase and the W-phase are also similarly designated.

Figure 28:
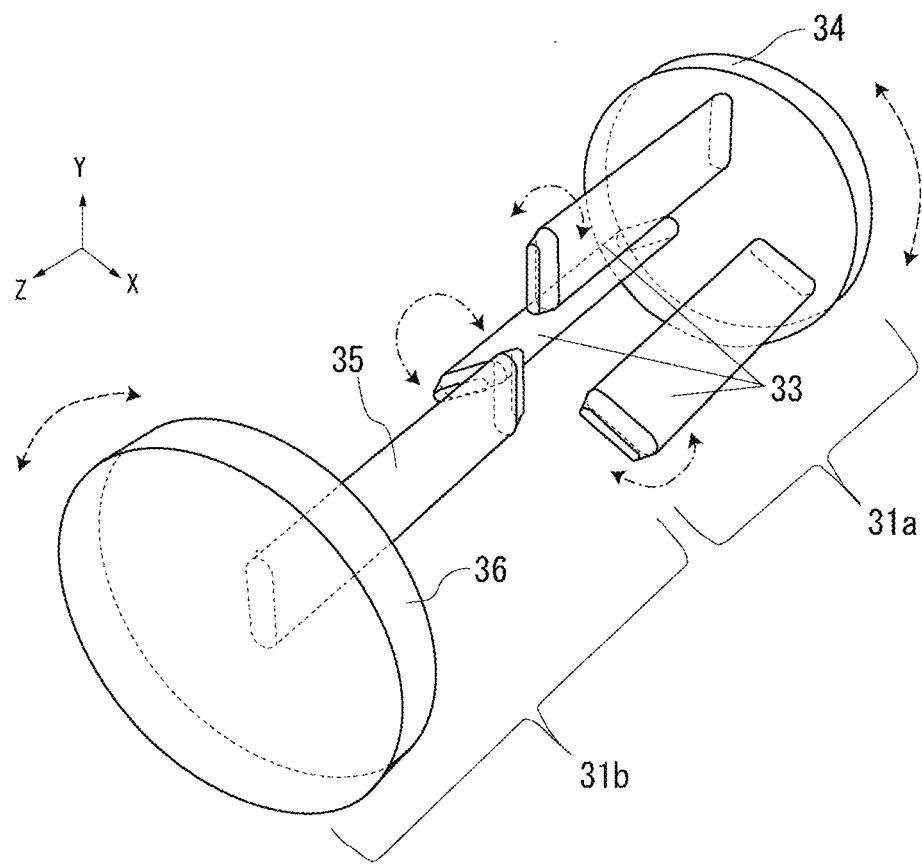
FIG. 28 is a perspective view of an arrangement unit related to the alternative arrangement step 1 of the first embodiment according to the present invention.

Next, the operation of the coil unit arrangement device according to the present invention will be explained with reference to FIG. 28 to FIG. 34. FIG. 28 illustrates a perspective view of the arrangement unit of the coil unit arrangement device of the first embodiment. Moreover, FIG. 29 illustrates change in the XY plan view when the holding section 31a in operation is seen in the Z-direction from the receiving section 31b.

Figure 29:
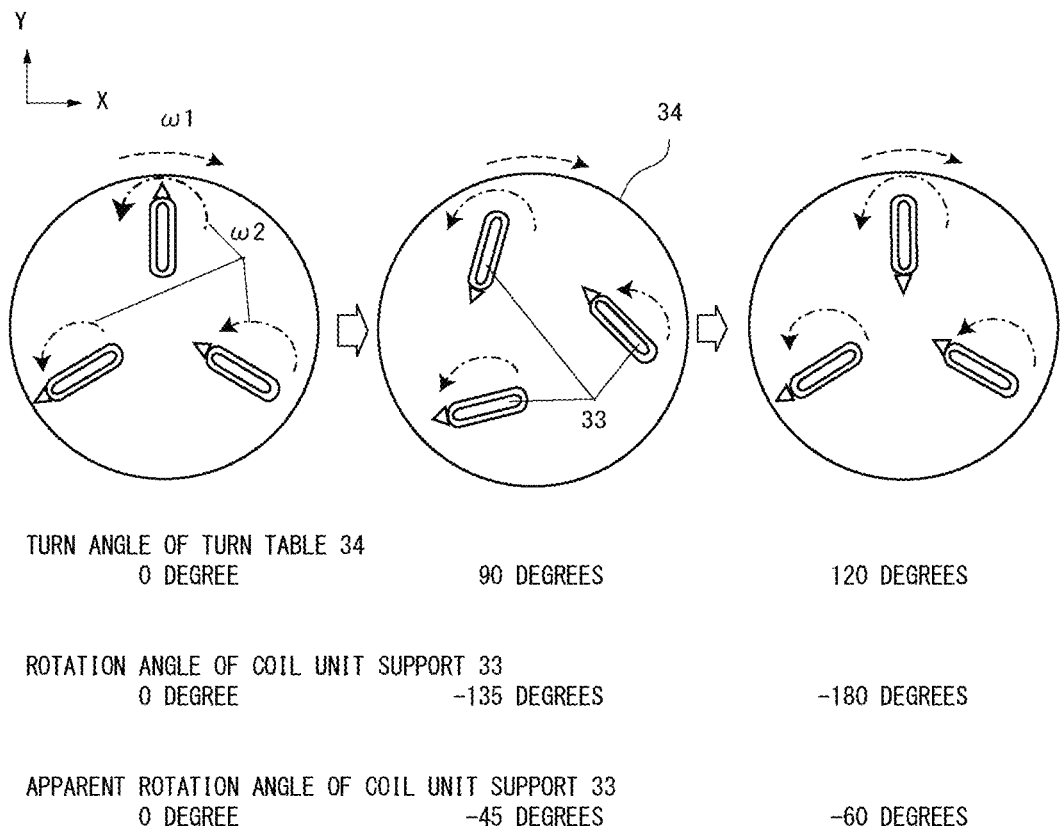
FIG. 29 is an XY plan view illustrating the movement of a holding section related to the alternative arrangement step 1 of the first embodiment according to the present invention.

As illustrated in the left view of FIG. 29, the central axes of the coil unit supports 33 are located at the positions of 0 o'clock, 4 o'clock, and 8 o'clock, respectively, when the turn table 34 is regarded as a clock, and are generally spaced each other by 120 degrees. Moreover, when the turn angle of the turn table 34 is 0 degree, if the angle of the coil unit support 33 located at the position of 0 o'clock is defined as 90 degrees, then the coil unit support 33 located at the position of 4 o'clock is connected to the turn table 34 at 150 degrees and the coil unit support 33 located at the position of 8 o'clock is connected to the turn table 34 at 30 degrees.

The coil unit support 33 rotates counterclockwise at the rotation speed ω2 indicated by a one-dotted and dashed line arrow, while the turn table 34 turns clockwise at the turn speed ω1 indicated by a broken line arrow. The relationship between ω1 and ω2 is set as ω2=−1.5×ω1.

Therefore, when the turn table 34 turns by 90 degrees, the coil unit support 33 located at the position of 0 o'clock in an initial state will move to the position of 3 o'clock. At this time, since the coil unit support 33 rotates by −135 degrees, it apparently rotates counterclockwise by −45 degrees.

When the turn table 34 turns by 120 degrees, the coil unit support 33 located at the position of 0 o'clock in the initial state will come to the position of 4 o'clock, and then coincides with, in angle, the coil unit support 33 located at the position of 4 o'clock in the initial state. When the turn table 34 rotates clockwise once, the coil unit support 33 will rotate counterclockwise three half-turns. At this time, the coil unit support 33 apparently rotates counterclockwise a half turn as the result of subtracting one revolution (turn of the turn table 34).

Figure 30:
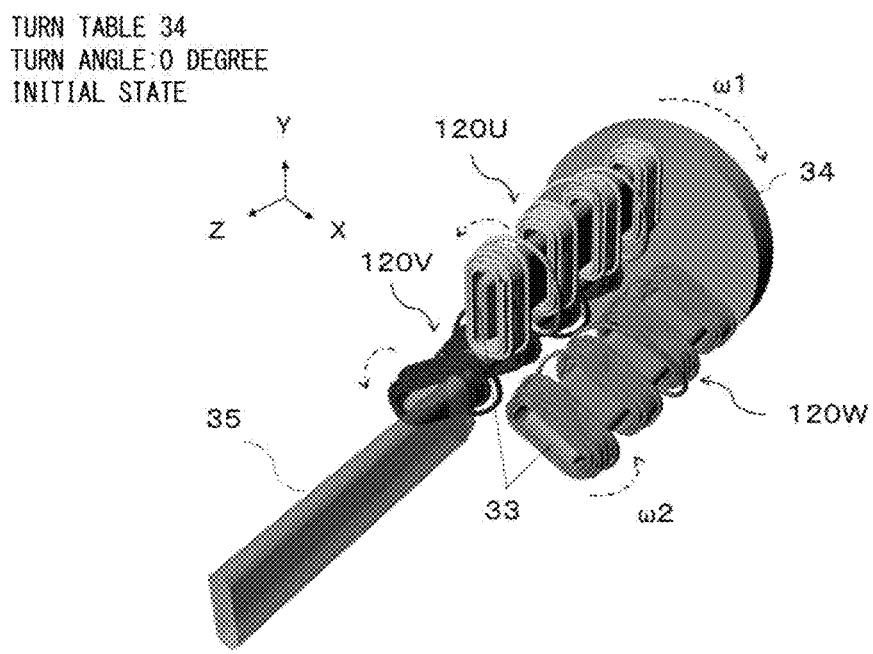
FIG. 30 is a perspective view in an initial state of the holding section related to the alternative arrangement step 1 of the first embodiment according to the present invention.

FIG. 30 illustrates an initial state in which three-phases of coil units 120 are set to the coil unit support 33 of the holding section 31a. The initial state of each coil unit 120 is as follows.

The coil unit 120U is installed to the coil unit support 33 located at the position of 0 o'clock so that a coil end, to which the jumper wire 122 of the coil 121U1 is connected, is located on the outer diameter side of the turn table 34. A coil unit 120V is installed to the coil unit support 33 located at the position of 8 o'clock so that a coil end, to which the jumper wire 122 of a coil 121V1 is connected, is located on the center side of the turn table 34. A coil unit 120W is installed to the coil unit support 33 located at the position of 4 o'clock so that a coil end, to which the jumper wire 122 of a coil 121W1 is connected, is located on the outer diameter side of the turn table 34.

An operation to obtain an array coil group, in which the jumper wire 122 is located on the same side of the jumper wire 122 of another phase without crossing of the jumper wires 122, will be explained with reference to FIG. 31 to FIG. 34.

Figure 31:
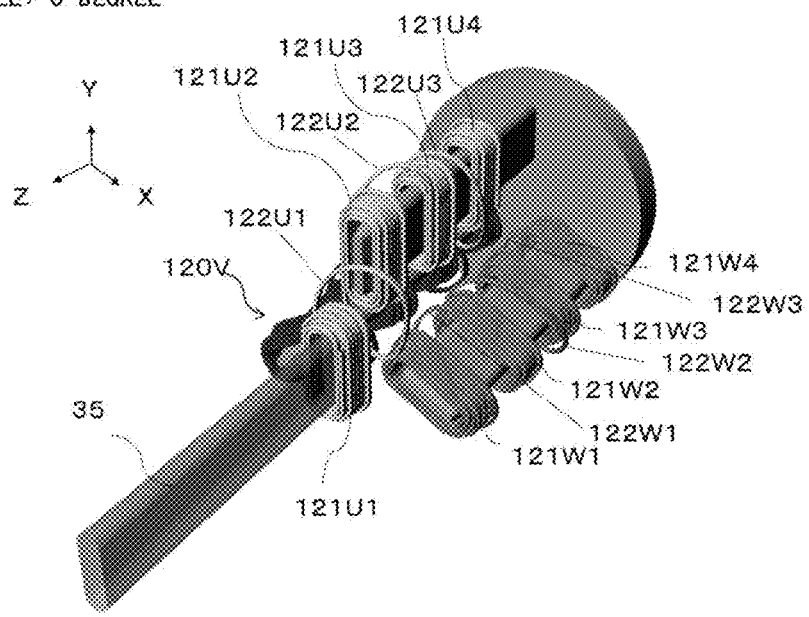
FIG. 31 is a perspective view at the time of the turn angle 0 degree of a turn table of the holding section related to the alternative arrangement step 1 of the first embodiment according to the present invention.
Figure 32:
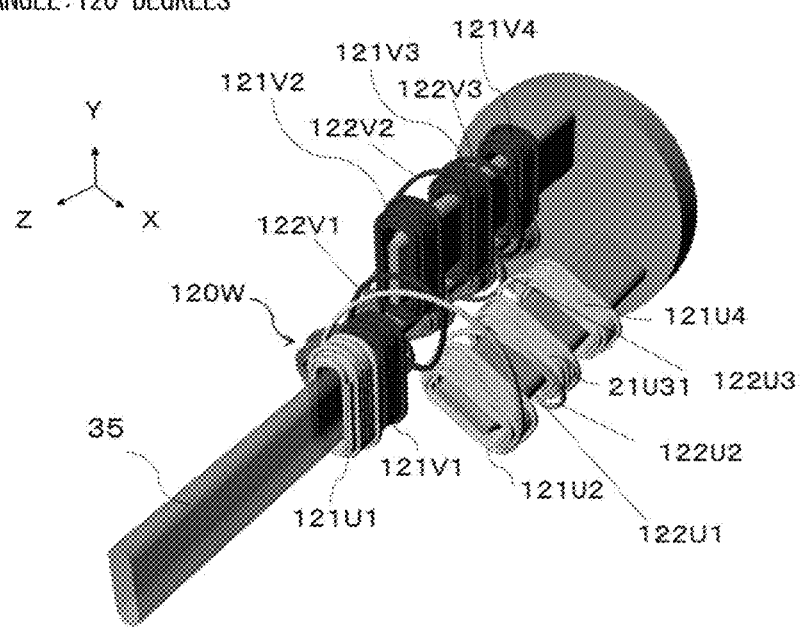
FIG. 32 is a perspective view at the time of the turn angle 120 degrees of the turn table of the holding section related to the alternative arrangement step 1 of the first embodiment according to the present invention.

As with the first embodiment, as illustrated in FIG. 31, from the initial state of FIG. 30 the coil 121U1 of the coil unit 120U is fitted into the array coil group support 35 by being grabbed and conveyed by the conveying section 31c. Next, as illustrated in FIG. 32, from the state of FIG. 31 the turn table 34 is turned clockwise by 120 degrees so as to be located at the position of turn angle 120 degrees, and the coil 121V1 of the coil unit 120V is fitted into the array coil group support 35. At this time, for the coil 121V1 of the coil unit 120V which is to be fitted into the array coil group support 35 next and the coil 121U2 located at a tip of the coil unit support 33 located at the position of 4 o'clock, the coil ends thereof on the side to which the jumper wire 122 is connected are located on the outer diameter side of the turn table 34. Moreover, for the coil 121W1 located at a tip of the coil unit support 33 located at the position of 8 o'clock, the coil end thereof on the side, to which the jumper wire 122 is connected, is located on the center side of the turn table 34. Moreover, the jumper wire 122U1 passes through the upper side (plus direction side of the Y-axis) of the coil 121V1 and links the coil 121U1 and the coil 121U2.

Figure 33:
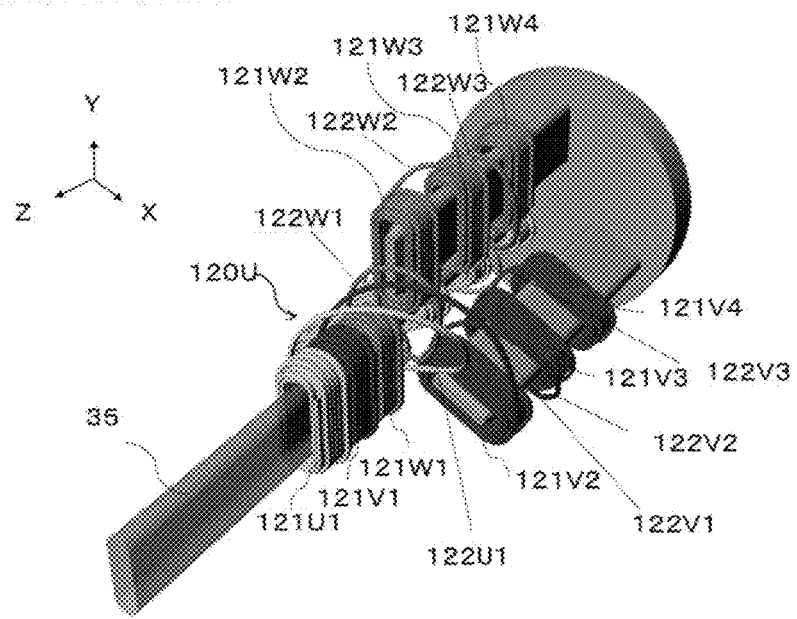
FIG. 33 is a perspective view at the time of the turn angle 240 degrees of the turn table of the holding section related to the alternative arrangement step 1 of the first embodiment according to the present invention.

Next, as illustrated in FIG. 33, from the state of FIG. 32 the turn table 34 is further turned clockwise by 120 degrees so as to be located at the position of turn angle 240 degrees, and the coil 121W1 of the coil unit 120W is fitted into the array coil group support 35. At this time, the jumper wire 122U1 is connected to the coil 121U2 via the back side (minus side in the Z-direction) of the coil 121W1.

Figure 34:
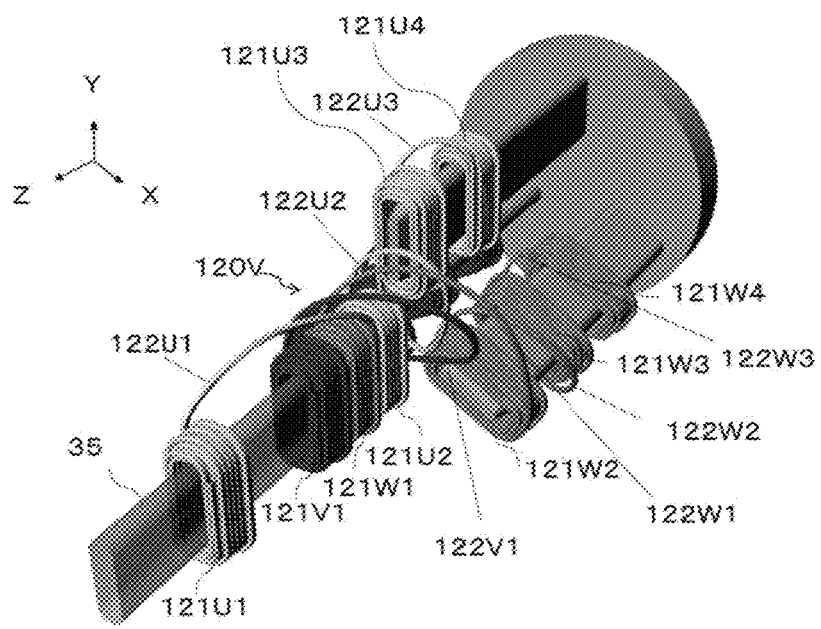
FIG. 34 is a perspective view at the time of the turn angle 360 degrees of the turn table of the holding section related to the alternative arrangement step 1 of the first embodiment according to the present invention.

Next, as illustrated in FIG. 34, from the state of FIG. 33 the turn table 34 is further turned clockwise by 120 degrees so as to be located at the position of turn angle 360 degrees, and the coil 121U1 fitted into the array coil group support 35 is fed in the Z-direction so as to fit the coil 121U2 of the coil unit 120U into the array coil group support 35.

In the course of the turn angle of the turn table 34 changing from 240 degrees to 360 degrees, the jumper wire 122U1 passes through the back side (minus side in the Z-direction) of the coil 121W1 by the rotation of the turn table 34 of the holding section 31a and the rotation of the coil unit support 33, and further passes through the gap in the Z-direction between the coil unit support 33 and the array coil group support 35.

Since the coil unit 120 apparently rotates counterclockwise a half turn every time the turn table 34 rotates once, all the coils 121 to be fitted into the array coil group support 35 face the same direction. Therefore, by fitting all the coils 121 into the array coil group support 35 by repeating the above-described works, the array coil group 23, as with FIG. 18, arranged in a line in the arrangement order with respect to the stator can be obtained without crossing of the jumper wires 122.

(An Alternative Arrangement Step 2 Performed by the Coil Unit Arrangement Device of the First Embodiment)

Next, an alternative arrangement step 2 performed by the coil unit arrangement device of the first embodiment will be explained with reference to FIG. 35 to FIG. 44. In a coil unit to be arranged in the alternative arrangement step 2 performed by the coil unit arrangement device of the first embodiment, the number of revolutions of the jumper wire around the central axis TT is a half and the coils of a coil unit face the same direction. Moreover, the arrangement unit includes a restraint tool for restraining a jumper wire. Note that, since the conveying section 31c is similar to the first embodiment, the explanation thereof is omitted.

FIG. 35A and FIG. 35B illustrate a coil unit 220 used in the alternative arrangement step 2 performed by the coil unit arrangement device of the first embodiment. In the coil unit 220, four coils 221 and five jumper wires 222 each revolving around the central axis TT a half turn are constituted from the coil wire 2. In the coil 221, three places including two places in a vicinity of a place where the coil part 221 and the jumper wire 221 are connected are restrained with the tacking tape P so as to prevent the coil 221 from expanding in the central-axis TT direction and also so as to prevent the coil wire 2 in a vicinity of jumper wire 222 constituting the coil 221 from deforming. The coils 221 in front of and behind the jumper wire 222 are connected in the same positional relationship around the central axis TT. In the following figures, for simplicity, drawing of the tacking tape P will be omitted.

Three phases of coil units 220 are prepared in this manner. Moreover, three phases are referred to as a U-phase, a V-phase, and a W-phase, and as illustrated in FIG. 36 a coil unit of the U-phase is designated by 220U, and sequentially from the lower side of the page the coils of the coil unit are designated by 221U1, 221U2, 221U3, and 221U4 and the jumper wires between the coils are designated by 222U1, 222U2, and 222U3. The V-phase and the W-phase are also similarly designated.

Figure 37:
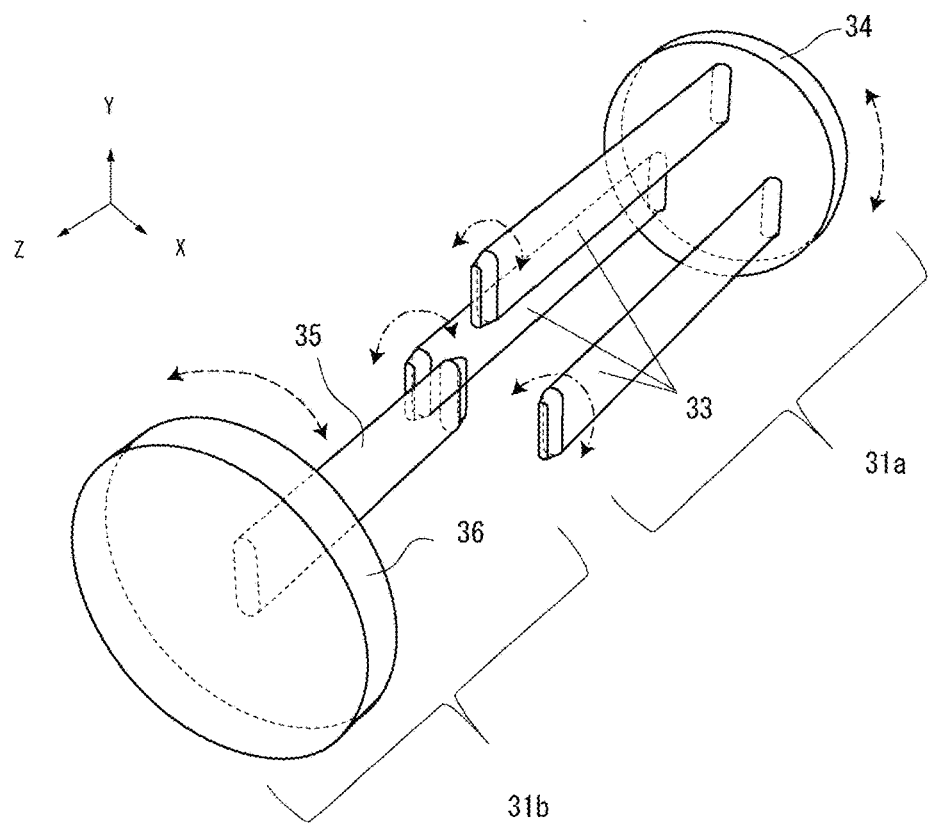
FIG. 37 is a perspective view of an arrangement unit related to the alternative arrangement step 2 of the first embodiment according to the present invention.
Figure 38:
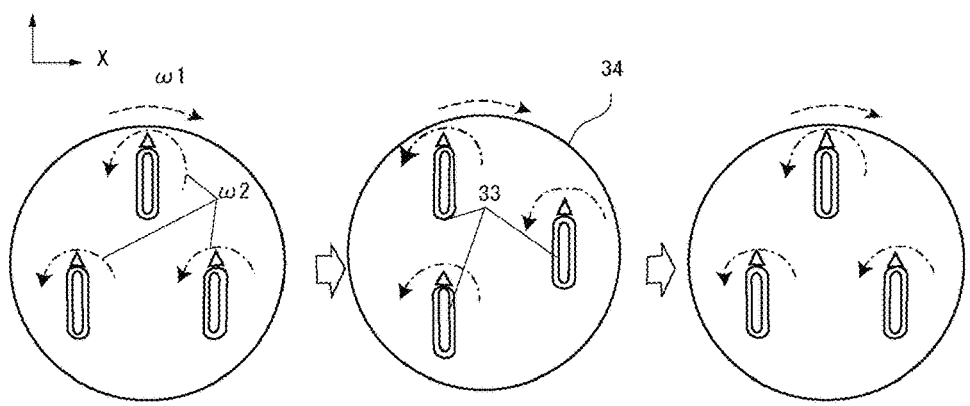
FIG. 38 is an XY plan view illustrating the movement of a holding section related to the alternative arrangement step 2 of the first embodiment according to the present invention.

Next, the operation of the coil unit arrangement device according to the present invention will be explained with reference to FIG. 37 to FIG. 44. FIG. 37 illustrates a perspective view of the arrangement unit of the coil unit arrangement device of the first embodiment. FIG. 38 illustrates change in the XY plan view when the holding section 31a in operation in the alternative arrangement step 2 performed by the coil unit arrangement unit of the first embodiment is seen in the Z-direction from the receiving section 31b.

As illustrated in the left view of FIG. 38, the central axes of the coil unit supports 33 are located at the positions of 0 o'clock, 4 o'clock, and 8 o'clock, respectively, when the turn table 34 is regarded as a clock, and are generally spaced each other by 120 degrees. Moreover, all the coil unit supports 33 are connected to the turn table 34 at the same angle.

The coil unit support 33 rotates counterclockwise at the rotation speed ω2 indicated by a one-dotted and dashed line arrow, while the turn table 34 turns clockwise at the turn speed ω1 indicated by a broken line arrow. The relationship between ω1 and ω2 is set as ω2=−ω1.

Therefore, when the turn table 34 turns by 90 degrees, the coil unit support 33 located at the position of 0 o'clock in an initial state will move to the position of 3 o'clock. At this time, since the coil unit support 33 rotates by −90 degrees, it apparently maintains the same angle.

When the turn table 34 turns by 120 degrees, the coil unit support 33 located at the position of 0 o'clock in the initial state will coincide with the position of the coil unit support 33 located at the position of 4 o'clock in the initial state. When the turn table 34 rotates clockwise once, the coil unit support 33 will rotate counterclockwise once and therefore apparently continue to maintain the same direction.

Figure 39:
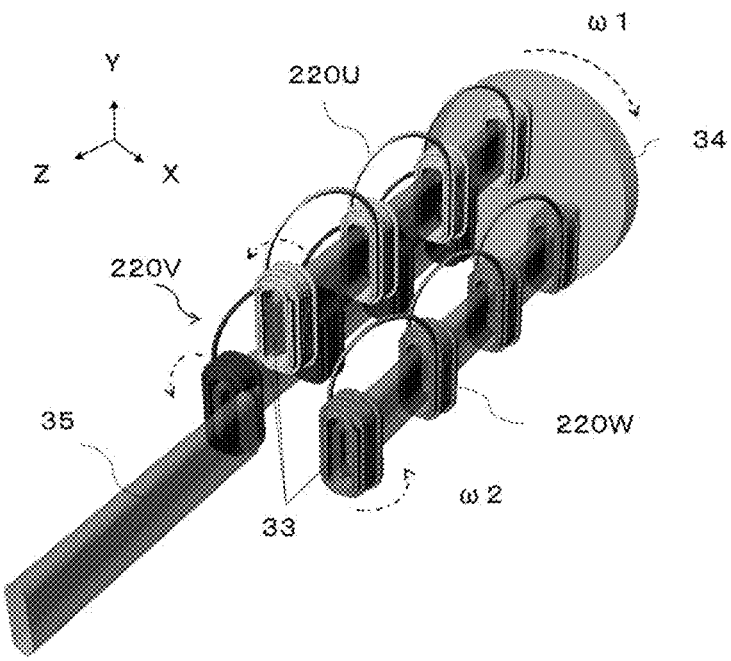
FIG. 39 is a perspective view in an initial state of the holding section related to the alternative arrangement step 2 of the first embodiment according to the present invention.

FIG. 39 illustrates an initial state in which the three-phases of coil units 220 are set to the coil unit support 33 of the holding section 31a doing such a motion. The initial state of each coil unit 220 is as follows.

The coil unit 220U is installed to the coil unit support 33 located at the position of 0 o'clock so that a coil end, to which the jumper wire 222 of the coil 221U1 is to be connected, is located on the outer diameter side of the turn table 34. So as to have the same direction as the coil unit 220U, the coil unit 220V is installed to the coil unit support 33 located at the position of 8 o'clock, and a coil unit 220W is installed to the coil unit support 33 located at the position of 4 o'clock.

An operation to obtain an array coil group, in which the jumper wire 222 is located on the same side of the jumper wire 222 of another phase without crossing of the jumper wires 222, will be explained with reference to FIG. 40 to FIG. 44.

Figure 40:
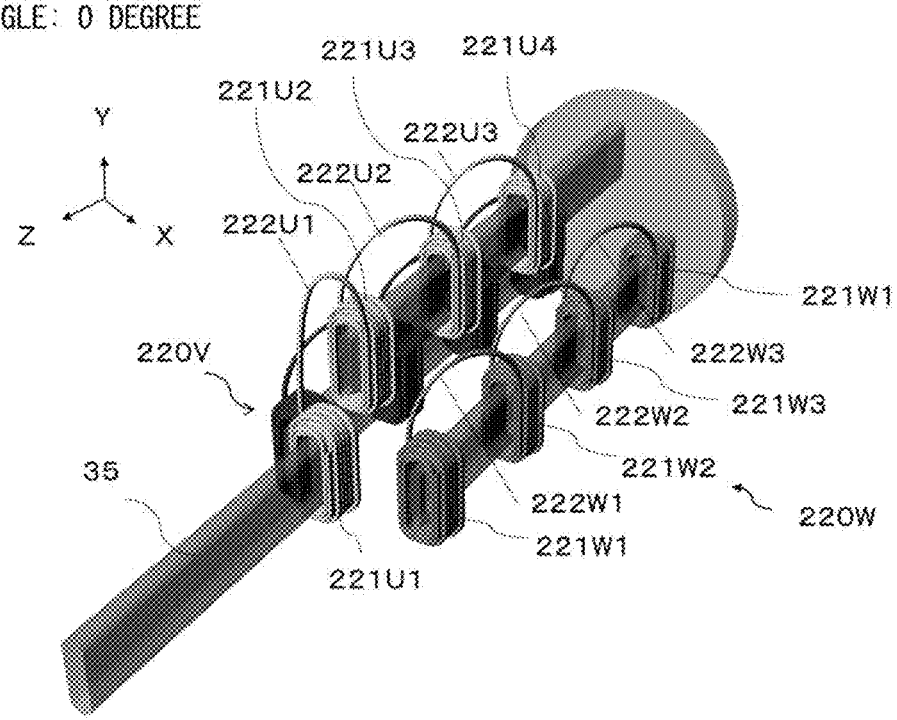
FIG. 40 is a perspective view at the time of the turn angle 0 degree of the turn table of the holding section related to the alternative arrangement step 2 of the first embodiment according to the present invention.
Figure 41:
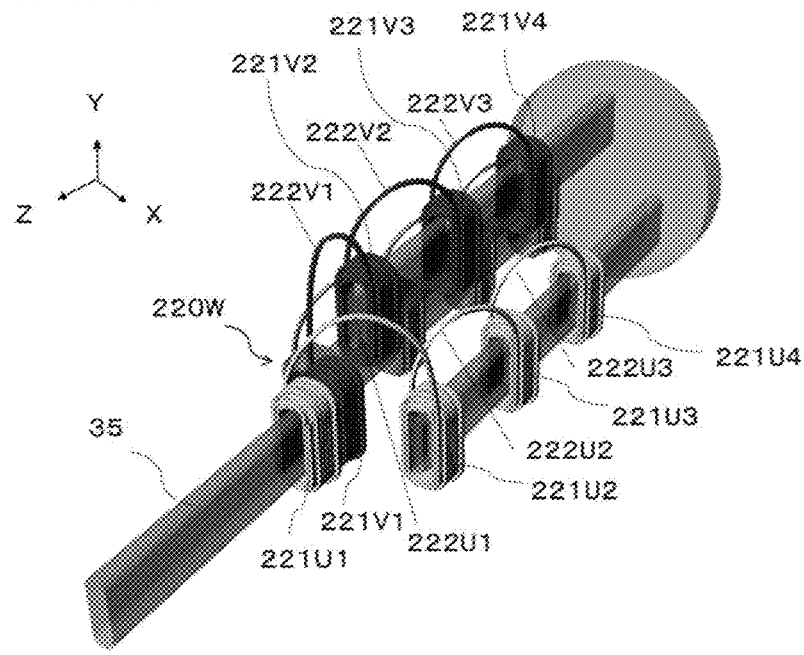
FIG. 41 is a perspective view at the time of the turn angle 120 degrees of the turn table of the holding section related to the alternative arrangement step 2 of the first embodiment according to the present invention.

As with the first embodiment, as illustrated in FIG. 40, from the initial state of FIG. 39 the coil 221U1 of the coil unit 220U is fitted into the array coil group support 35 by being grabbed and conveyed by the conveying section 31c. Next, as illustrated in FIG. 41, from the state of FIG. 40 the turn table 34 is turned clockwise by 120 degrees so as to be located at the position of turn angle 120 degrees, and the coil 221V1 of the coil unit 220V is fitted into the array coil group support 35. At this time, the jumper wire 222U1 passes through the upper side (plus direction side of the Y-axis) of the coil 221V1 and links the coil 221U1 and the coil 221U2.

Figure 42:
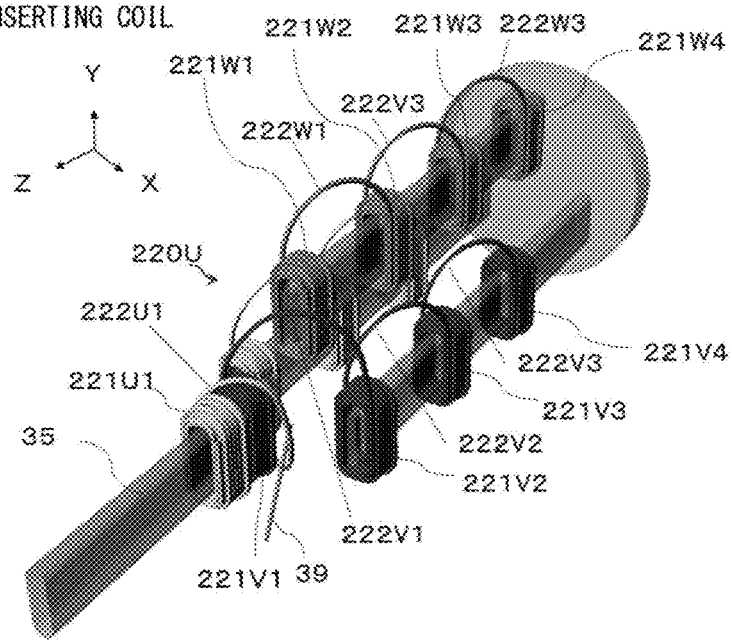
FIG. 42 is a perspective view before inserting a coil at the time of the turn angle 240 degrees of the turn table of the holding section related to an alternative arrangement step example 2 of the first embodiment according to the present invention.
Figure 43:
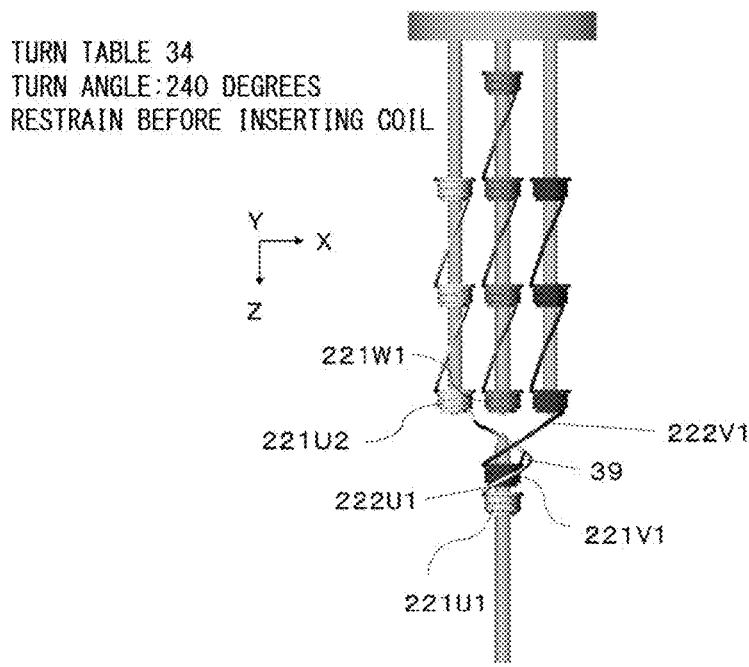
FIG. 43 is a ZX plan view before inserting a coil at the time of the turn angle 240 degrees of the turn table of the holding section related to the alternative arrangement step 2 of the first embodiment according to the present invention.

Next, as illustrated in FIG. 42, from the state of FIG. 41 the turn table 34 is further turned clockwise by 120 degrees so as to be located at the position of turn angle 240 degrees, and the jumper wire 222U1 which links the coil 221U1 and the coil 221U2 is restrained by using a restraint tool 39. As illustrated in FIG. 43, the jumper wire 222U1 restrained by the restraint tool 39 will revolve around the plus side in the X-direction with respect to a coil 221W1. Thus, as illustrated in FIG. 44, when the coil 221W1 is fitted into the array coil group support 35, the jumper wire 222U1 is connected to the coil 221U2 via the back side (minus side in the Z-direction) of the coil 221W1.

Figure 44:
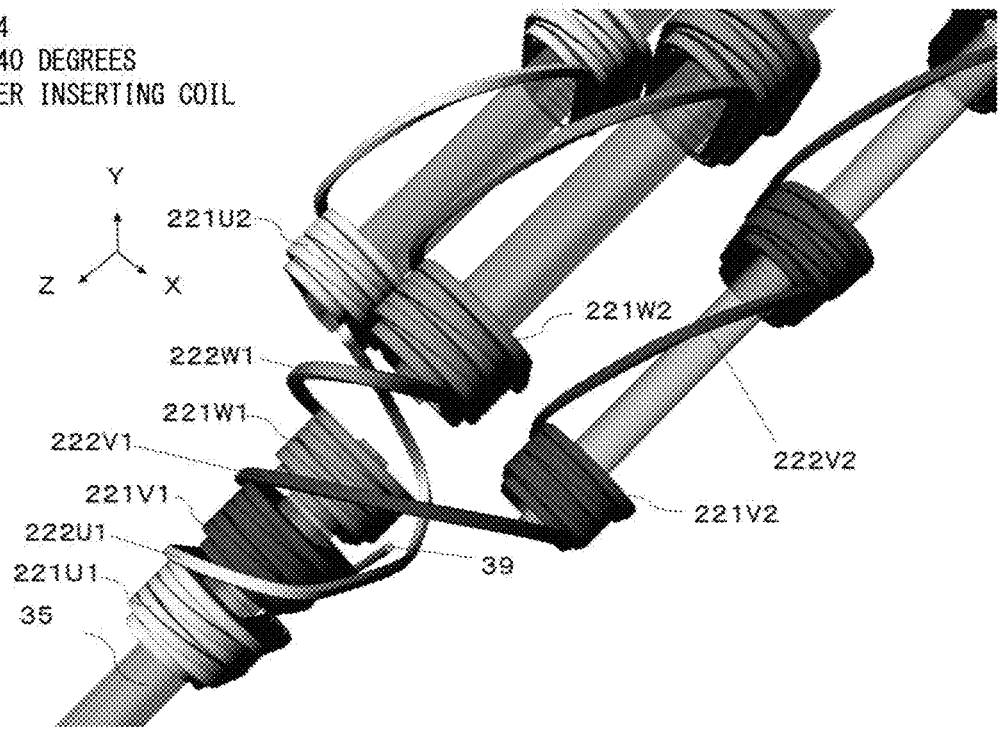
FIG. 44 is a perspective view after inserting a coil at the time of the turn angle 240 degrees of the turn table of the holding section related to the alternative arrangement step 2 of the first embodiment according to the present invention.

Next, from the state of FIG. 44, in the course of further turning the turn table 34 clockwise by 120 degrees so as to locate at the position of turn angle 360 degrees, the jumper wire 222U1 passes through the back side (minus side in the Z-direction) of the coil 221W1 by the turn of the turn table 34 of the holding section 31a and the rotation of the coil unit support 33, and further passes through the gap in the Z-direction between the coil unit support 33 and the array coil group support 35.

By fitting all the coils 221 into the array coil group support 35 by repeating the above-described works, the array coil group 23, as with FIG. 18, arranged in a line in the arrangement order with respect to the stator can be obtained without crossing of the jumper wires 222.

Figure 45:
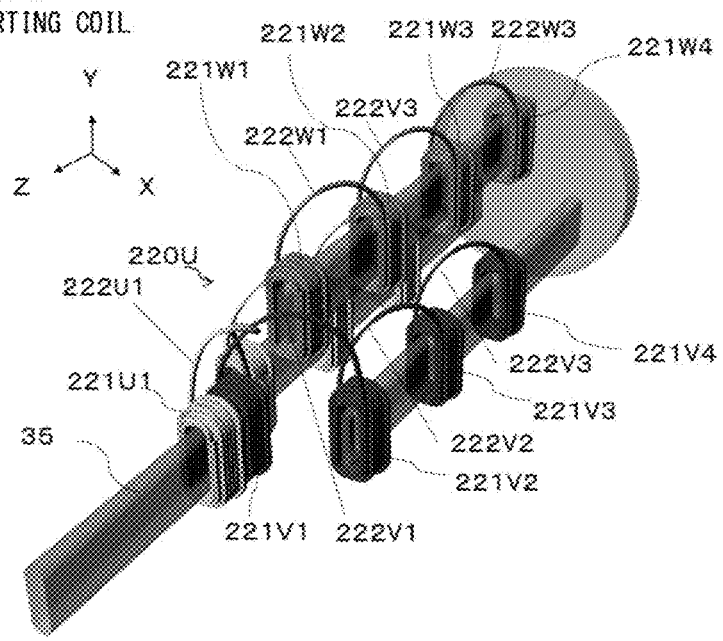
FIG. 45 is a perspective view before inserting a coil at the time of the turn angle 240 degrees of the turn table of the holding section when a restraint tool is not used.
Figure 46:
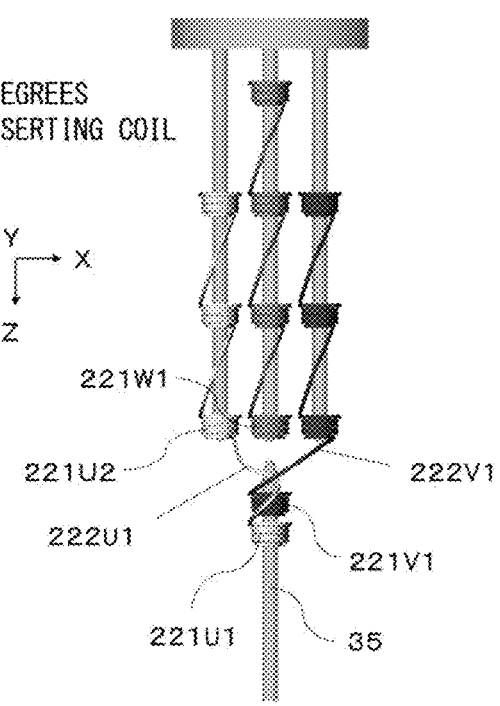
FIG. 46 is a ZX plan view before inserting a coil at the time of the turn angle 240 degrees of the turn table of the holding section when a restraint tool is not used.
Figure 47:
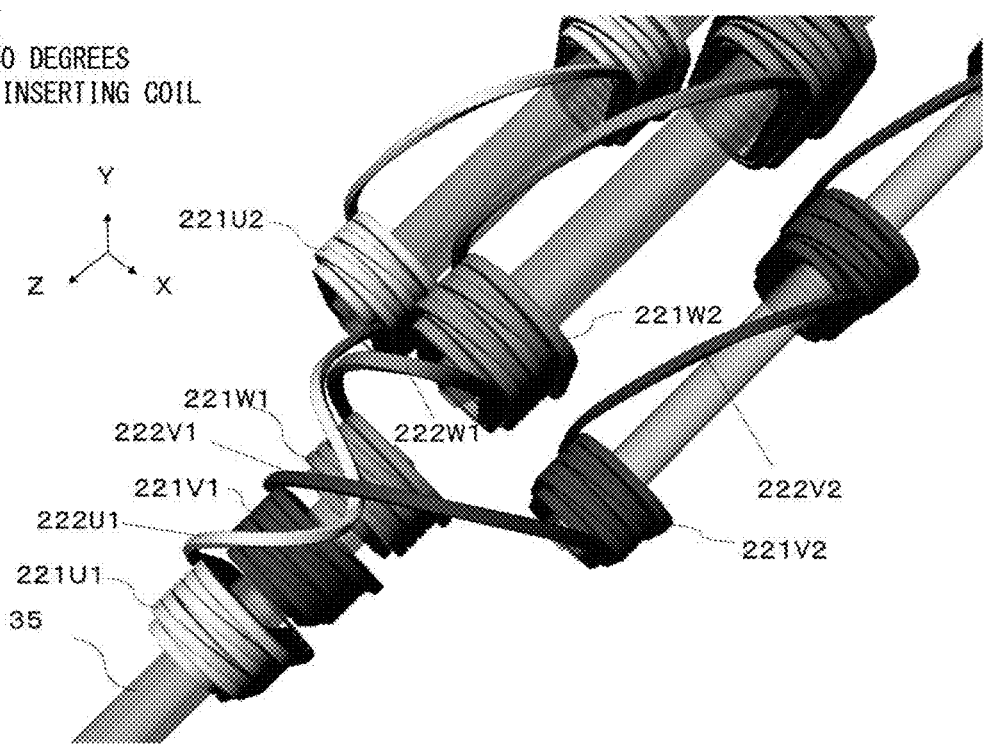
FIG. 47 is a perspective view after inserting a coil at the time of the turn angle 240 degrees of the turn table of the holding section when a restraint tool is not used.

FIG. 45 to FIG. 47 illustrate an example in which crossing of the jumper wires occurs without using the restraint tool 39. FIG. 45 is a perspective view before inserting the coil 221W1 relative to the array coil group support 35 at the turn angle 240 degrees of the turn table 34. Since the jumper wire 222U1 is not restrained by the restraint tool 39, it passes through the upper side of the page (plus side in the Y-direction) of the array coil group support 35 and connects to the coil 221U2 without drawing a large arc as illustrated in FIG. 43.

As illustrated in FIG. 46, when in this state the coil 221W1 is fitted into the array coil group support 35, then as illustrated in FIG. 47 the jumper wire 222U1 will connect to the coil 221U2 via the front side (plus side in the Z-direction) of a jumper wire 222W1.

In the course of the turn angle of the turn table 34 changing from 240 degrees to 360 degrees from the state of FIG. 47, the jumper wire 222U1 does not pass through the back side (minus side in the Z-direction) of the coil 221W1. In the array coil group manufactured by this method, although the coil 1 is arranged in the arrangement order, crossing of the jumper wire 222U1 and jumper wire 222W1 will occur.

As described above, just simply turning the turn table while the central axes of three-phases of coil units are maintained will cause crossing of jumper wires.

As described under the sub-title: (First Embodiment); (An alternative arrangement step 1 performed by the coil unit arrangement device of the first embodiment); and (An alternative arrangement step 2 performed by the coil unit arrangement device of the first embodiment), by appropriately adjusting the turn of the turn table 34 and the rotation of the coil unit support 33 in accordance with the revolution of the jumper wire of a coil unit formed in the forming step, the revolution of the jumper wire is cancelled by the arrangement step and setting step. By grabbing and conveying a coil by the conveying section 31c and fitting the coil into the array coil group support 35, the jumper wires are arranged on the same side without being crossed each other as illustrated in FIG. 18, and a coil group can be obtained in which coils are arranged in the arrangement order.

By using the coil unit arrangement device according to the present invention, a coil unit can be handled while the jumper wire of the coil unit is around the central axis TT. Since the jumper wire is not linear, the length in the Z-axis direction required for the holding section 31a in obtaining an array coil group can be reduced.

Moreover, even if the number of coils of a coil unit increases, a work to turn the turn table 34 of the holding section 31a and/or a work to rotate the coil unit support 33, and a work to fit a coil located at a specific position into the array coil group support 35 by being grabbed and conveyed by the conveying section 31c can be repeated. Furthermore, thanks to a turn movement in which the central axis of the coil units does not relatively move, the first embodiment can be implemented with a simple mechanism.

In the conventional technique, grabbing mechanisms corresponding to the number of coils of a coil unit are required, and also the number of coils to be grabbed needs to be reduced as the steps proceed. Moreover, the central axis of a coil unit needs to be relatively moved.

In the description under the sub-titles: (First Embodiment); (An alternative arrangement step 1 performed by the coil unit arrangement device of the first embodiment); and (An alternative arrangement step 2 performed by the coil unit arrangement device of the first embodiment), the cases have been explained where the turn table 34 turns while the array coil group support 35 and turn table 36 are fixed, but not limited thereto.

For example, the turn table 36 may be turned, with the turn table 34 being fixed. Moreover, the case has been explained where a specific position at which a coil is fit from the holding section 31a to the receiving section 31b is the position of 0 o'clock, but this specific position may be set at a plurality of places, e.g., the positions of 0 o'clock, 6 o'clock, etc.

Moreover, if the rotation rate of the coil unit support 33 is maintained with respect to one relative-rotation between the turn table 34 and the turn table 36, the rotation speed $\omega 1$ of the coil unit support 33 may vary.

While the amount of revolution with respect to the central axis of the jumper wire of a coil unit can be arbitrarily set in the forming step, within a coil unit there may be a jumper wire having a different number of revolutions. This case can be handled by appropriately adjusting, in the arrangement step, the rotation amount of the coil unit support 33 which supports the relevant coil unit.

Second Embodiment

A coil unit arrangement device of a second embodiment according to the present invention will be explained with reference to FIG. 48 to FIG. 50. The second embodiment differs in the configurations of the coil unit support and array coil group support from the first embodiment. Moreover, the conveying section 31c includes a guide bar in order to reliably perform the conveyance. The difference from the first embodiment will be explained.

Figure 48:
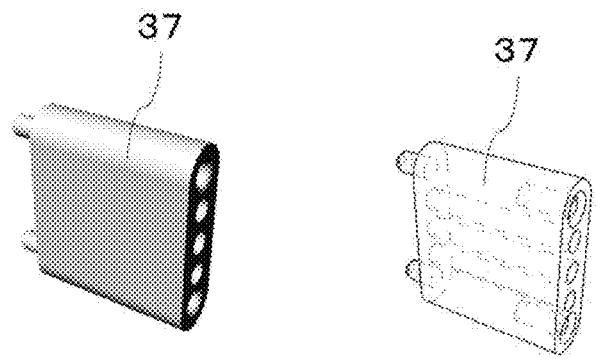
FIG. 48 is a perspective view of a divided support used for a coil unit support of a second embodiment according to the present invention.
Figure 49:
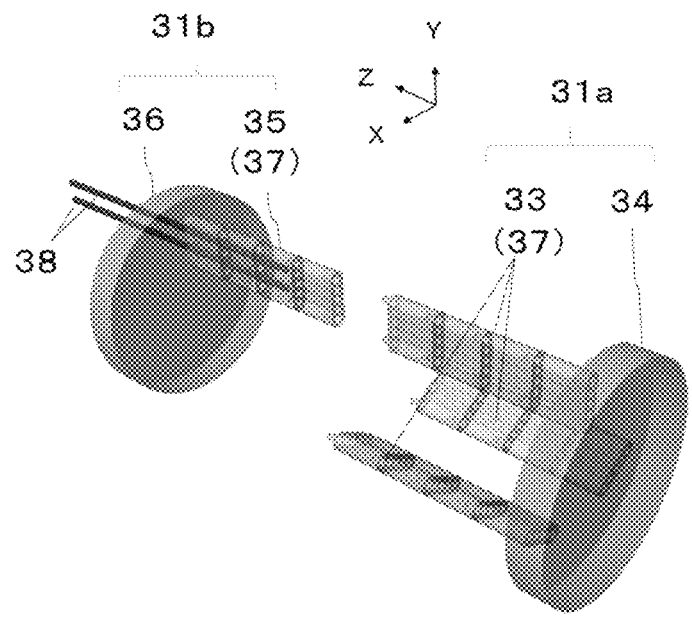
FIG. 49 is a perspective view of an arrangement unit of the second embodiment according to the present invention.

FIG. 48 illustrates a divided support used in the second embodiment. A divided support 37 has a structure capable of continuously engaging with another divided support 37 and also includes at least one through-hole. In the second embodiment, as illustrated in FIG. 49, the coil unit support 33 and array coil group support 35 are constituted by combining the divided support 37. Moreover, the turn table 36, to which the array coil group support 35 connects, also has a through-hole. The array coil group support 35 is set so as to face the coil unit support 33 at the position of 0 o'clock when the holding section 31a rotates.

The conveying section 31c includes a guide bar 38 which extends through the through-holes of the divided support 37 and turn table 36.

Figure 50A:
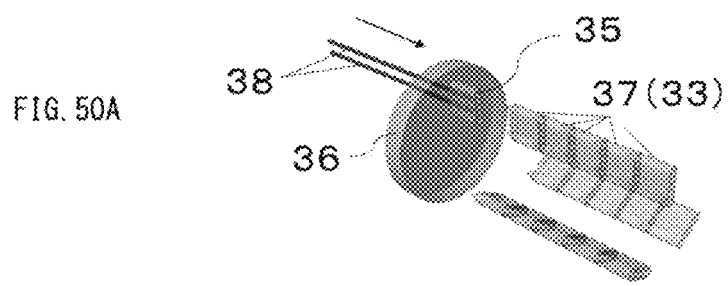
FIG. 50A to FIG. 50C are perspective views illustrating the movement of the arrangement unit of the second embodiment according to the present invention.

As illustrated in FIG. 50A, once the array coil group support 35 and coil unit support 33 face each other, then the guide bar 38, which has been retreated, moves in the solid-line arrow direction and reaches the through-hole of the divided support 37 located at the leading edge of the coil unit support 33.

Figure 50B:
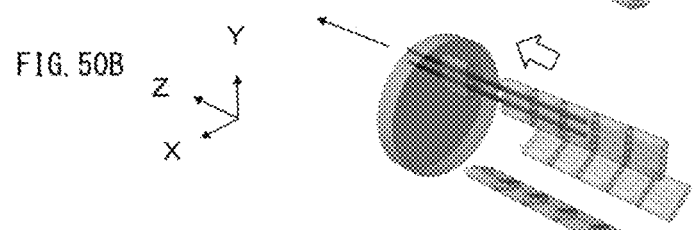

Subsequently, as illustrated in FIG. 50B, the divided support 37 at the edge is moved in the hollow-arrow direction and connected to the array coil group support 35 while being guided by the guide bar 38. Once the connection between the divided support 37 and the array coil group support 35 is complete, then the guide bar 38 retreats in the solid-line arrow direction so as not to prevent the rotation of the holding section 31a.

Figure 50C:
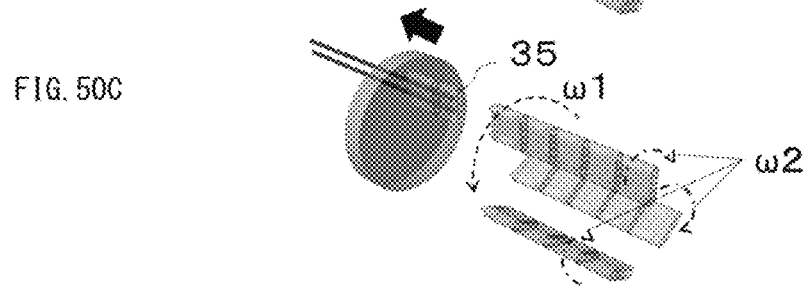

At this time, the turn table 36 moves in the black arrow direction of FIG. 50C in accordance with an interval between the array coil group support 35 and the coil unit support 33 which is to be faced next. The holding section 31a may be moved in the −Z-direction.

By constituting the coil unit support 33 and array coil group support 35 from the divided support 37 in this manner, the following advantages can be obtained.

By grabbing and conveying the divided support 37 supporting a coil to be fitted, with the conveying section 31c, there is no need to directly grab a coil and therefore the damage to an insulating coating by grabbing can be alleviated. Moreover, also for the array coil group support 35 supporting an array coil group, the array coil group needs to be appropriately slid in the Z-direction, but by linking the divided supports 37, a required amount of slide will decrease and the damage to an insulating coating of the coil wire on the inner peripheral side of the coil can be alleviated.

Moreover, since the divided support 37 has a through-hole so as to cause the guide bar 38 to guide the divided support 37, the divided support 37 can be stably and reliably moved from the holding section 31a to the receiving section 31b. A through-hole may be provided in the turn table 34 so as to cause the guide bar 38 to extend therethrough from the holding section 31a toward the receiving section 31b.

Third Embodiment

A coil unit arrangement device of a third embodiment according to the present invention will be explained with reference to FIG. 51 and FIG. 52. The third embodiment has the same configuration as the first embodiment except that the coil unit includes a divided stator core, as compared with the first embodiment. The difference from the first embodiment will be explained.

Figure 51A:
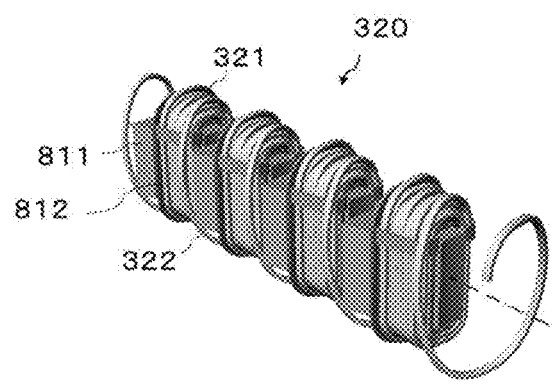
FIG. 51A and FIG. 51B illustrate perspective views of a coil unit to be arranged of a third embodiment and a coil unit support according to the present invention.
Figure 51B:
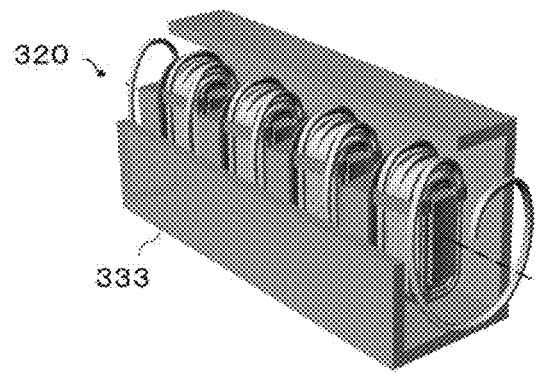

FIG. 51A and FIG. 51B illustrate a coil unit 320 used in the third embodiment. In the coil unit 320, four coils 321 and five jumper wires 322 revolving around the central axis once are constituted from the coil wire 2. By applying a method similar to the fitting step of the first embodiment illustrated in FIG. 20 to a coil unit, the coil 321 is fitted into the divided stator core 811 fitted with the insulating member 812.

By using a tubular coil unit support 333, the coil unit 320 with a divided stator core can be rotated while being turned, as with the first example.

Figure 52A:
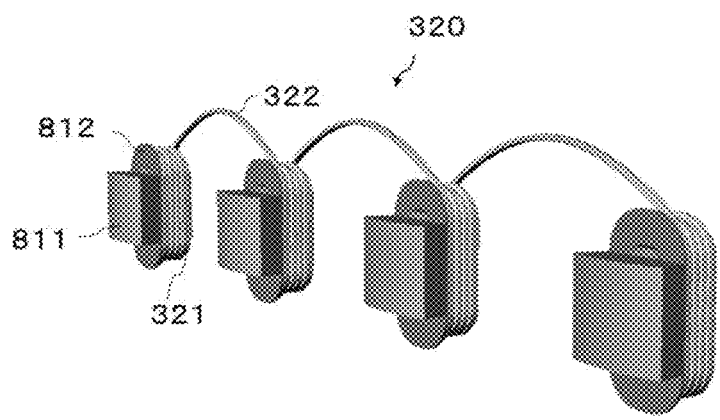
FIG. 52A and FIG. 52B illustrate perspective views of a coil unit to be arranged of the third embodiment and a coil unit support according to the present invention.
Figure 52B:
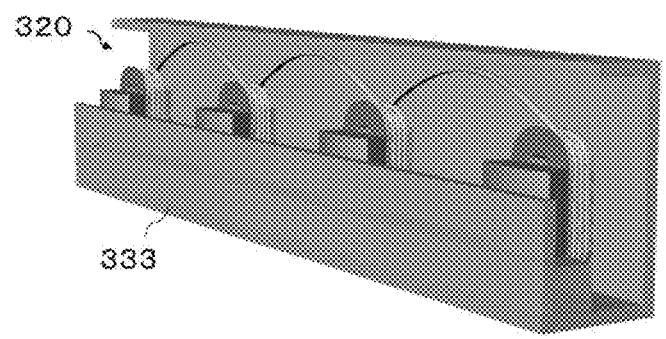

As illustrated in FIG. 52A and FIG. 52B, by using the tubular coil unit support 333, the central axis of a coil can also be caused to intersect with the longitudinal direction of the coil unit support 333.

The cross section of the tabular coil unit support 333 desirably has an opening for the pawl 32 of the conveying section 31c to pass therethrough so that the tubular coil unit support 333 can feed or fix the relevant coil 321. Although not illustrated, also for the array coil group support 35, a tubular one similar to the coil unit support 333 is desirably used.

In addition to this, by utilizing the fact that the material of the divided stator core is ferromagnetic, the coil unit 320 may be supported and rotated by a rod-like magnetic body.

Thus, even for a concentrated-winding formed by ordinary bobbin winding, an operation similar to the coil having an air core part becomes possible.

Fourth Embodiment

A coil unit arrangement device of a fourth embodiment according to the present invention will be explained with reference to FIG. 53 to FIG. 55. The fourth embodiment differs from the first embodiment in that the coil unit supports are moved one by one. The difference from the first embodiment will be explained.

A coil unit will be explained in a case where three coil units 20 of FIG. 5 are used and among the coils 21 of the coil unit 20 which is located at the position of 0 o'clock by the turn of the turn table 34, the coil 21 on the tip side in the Z-axis direction supported by the coil unit support 33 is fitted into the array coil group support 35 so as to obtain an array coil group in which the coils 21 are arranged in a predetermined arrangement order.

FIG. 53A to FIG. 53C illustrate a perspective view, YZ plan view, and XY plan view of an arrangement unit used in the fourth embodiment respectively. A holding body 41 is fixed to a non-illustrated base and holds a coupling 42 to which the coil unit support 33 connects. The holding body 41 is desirably installed so that in the XY plan view illustrated in FIG. 53C a locus for the coupling 42 to pass through the holding body 41 coincides with a locus of the turn of a rotor 43 associated with the turn of the turn table 34.

As illustrated in FIG. 54A and FIG. 54B, the holding body 41 includes a retrogression prevention tool 411 in order to prevent the retrogression of the coupling 42 to be housed into the holding body 41. The retrogression prevention tool 411 rotates about a rotary shaft 414 which is journaled by a bearing 413 fixed to the holding fixture 41. Moreover, the rotation of the retrogression prevention tool 411 is restricted by a stopper 412. Thus, the retrogression prevention tool 411 cannot prevent the coupling 42 from entering the holding body 41, but prevents the coupling 42 from retrogressing.

The coupling 42 and rotor 43 include two or more through-holes for a connection bar 44 to pass therethrough. The through-bar 44 is capable of reciprocating in the Z-direction. The through-bar 44 extends through the coupling 42 and rotor 43 so as to turn and rotate the coil unit support 33 which is connected to the coupling 42.

The coupling 42 is desirably provided with a slit so as to be stably held by the holding body 41.

In the following figures, the drawing related to the retrogression prevention tool 411 will be omitted.

The movement of the coil unit support 33 will be explained. In the initial state, as illustrated in the state (a) of FIG. 55 all three coil unit supports 33 are caused to be held by the holding body 41 while being adjacent to each other with the position of 9 o'clock as the center.

Figure 55:
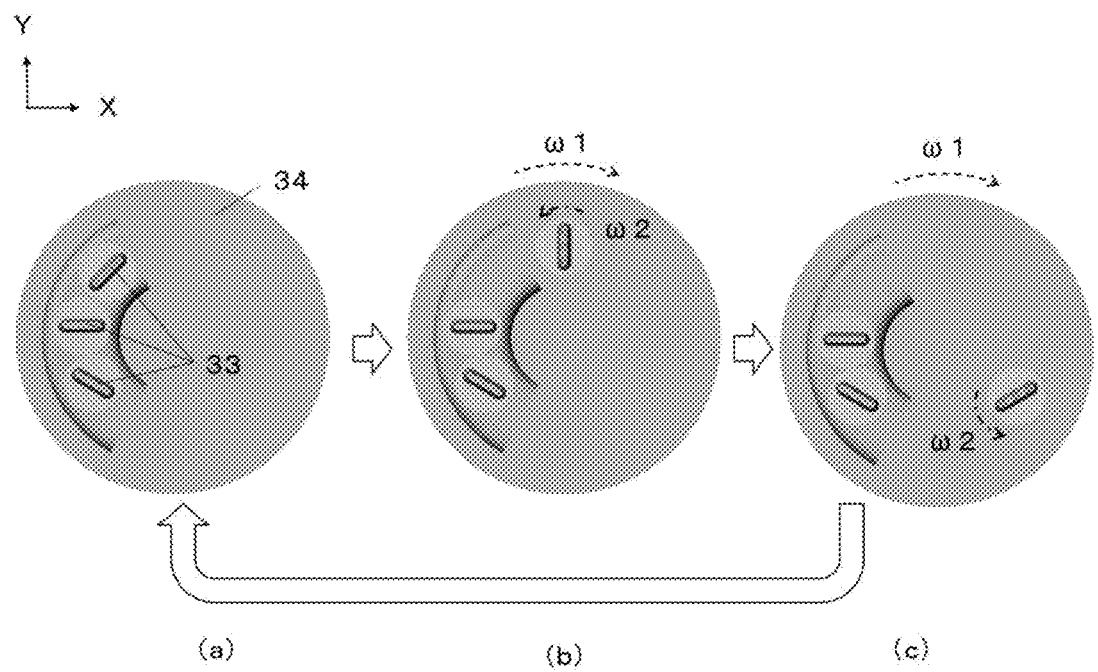
FIG. 55 is a schematic diagram illustrating a positional relationship of a coil unit support when the turn table of the fourth embodiment according to the present invention rotates once.
Figure 56:
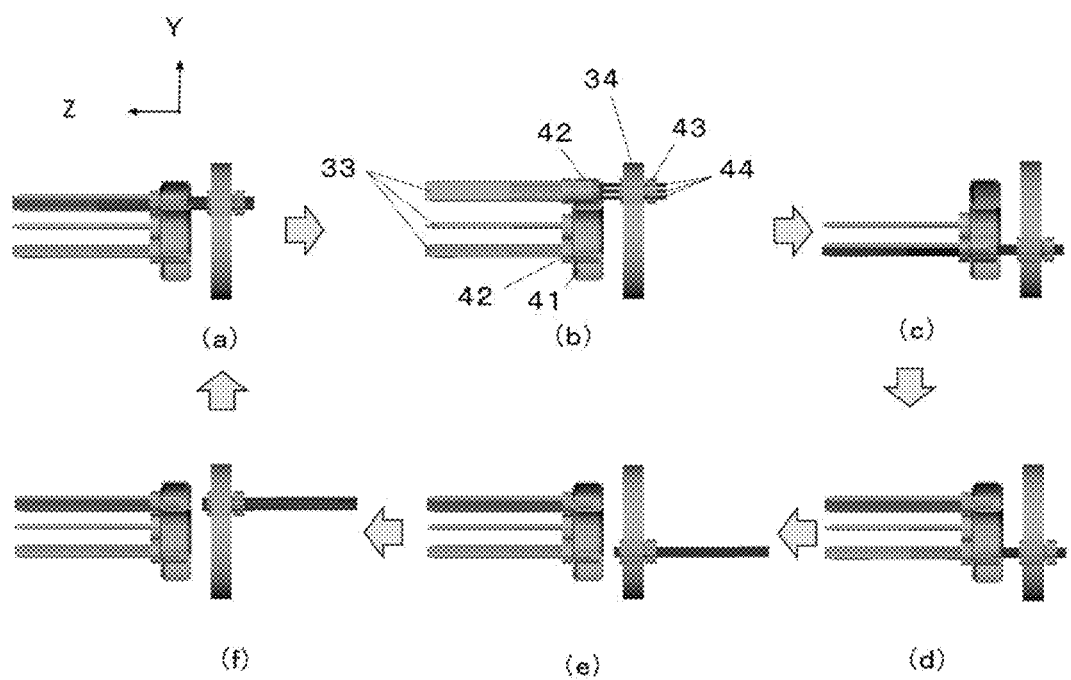
FIG. 56 is a YZ plan view illustrating a positional relationship of a through-bar when the turn table of the fourth embodiment according to the present invention rotates once.
Figure 57:
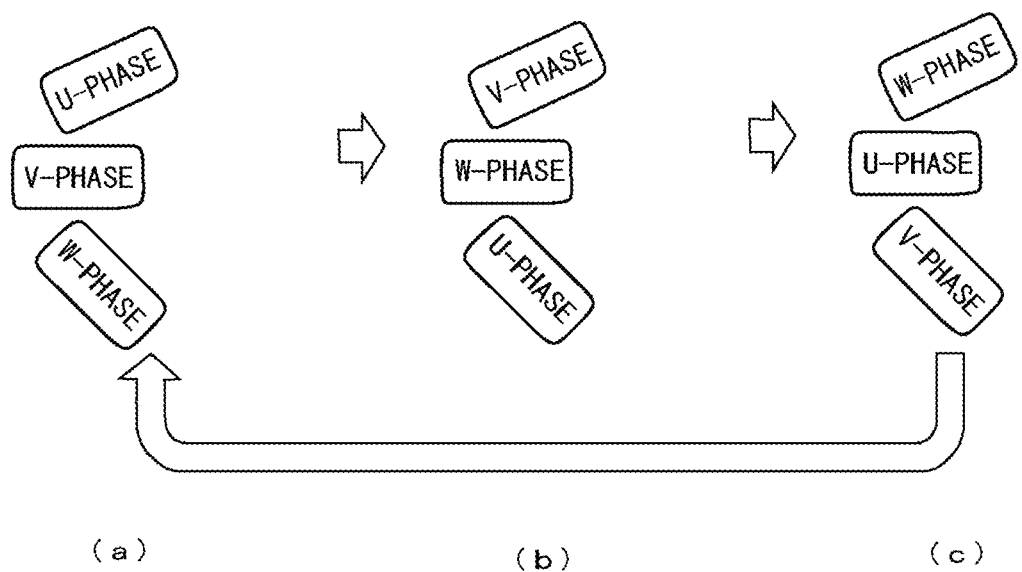
FIG. 57 is a schematic diagram illustrating a positional relationship of a coil unit for each one revolution of the turn table of the fourth embodiment according to the present invention.

As illustrated in the state (a) of FIG. 56, the turn table 34 is turned and the rotor 43 is rotated from the state (a) of FIG. 55 so as to align the coupling 42 closer to the position of 0 o'clock with the through-hole of the rotor 43 and cause the connection bar 44 to extend therethrough.

The coil unit support 33 rotates counterclockwise indicated by the one-dotted and dashed line arrow at the rotation speed ω2, while the turn table 34 turns clockwise indicated by the broken line arrow at the turn speed ω1. The relationship between ω1 and ω2 is generally set as ω2=−2×ω1.

As illustrated in the state (b) and the state (c) of FIG. 55, from state (a) of FIG. 56, by the turn of the turn table 34 which turns via the through-bar 44 and the rotation of the coil unit support 33, the coil unit 20 will rotate while turning from the position of 0 o'clock to the position of 4 o'clock. Subsequently, the coil unit 20 will be turned to the position of 8 o'clock while pushing up another coil unit 20 held by the holding body 41.

The state (b) of FIG. 56 is the YZ plan view of the state (b) of FIG. 55, while the state (c) of FIG. 56 is the YZ plan view of the state (c) of FIG. 55.

The state (d) of FIG. 56 is the XY plan view when the turning coil unit 20 is turned to the position of 8 o'clock while pushing up another coil unit 20.

As illustrated in the state (e) of FIG. 56, at the position of 8 o'clock the through-bar 44 is moved in the −Z-direction to cancel the connection with the turn table 34.

In this state, as illustrated in the state (f) of FIG. 56, the turn table 34 is turned and the rotor 43 is rotated so as to align the through-hole of the rotor 43 with the coupling 42 closer to the position of 0 o'clock.

As illustrated in the state (a) of FIG. 55, the coil unit 20 is installed in order of U-phase, V-phase, and W-phase from the coil unit support 33 closer to the position of 0 o'clock. In the fourth embodiment, as with the state (a) of FIG. 55→the state (b) of FIG. 55→the state (c) of FIG. 55→the state (a) of FIG. 55, the coil unit supports 33 are, one by one, turned and rotated via the through-bar 44.

At this time, by the turn of the turn table 34, among the coils 21 of the coil unit 20 located at the position of 0 o'clock, the coil 21 on the tip side in the Z-axis direction supported by the coil unit support 33 is fitted into the array coil group support 35 so as to obtain an array coil group in which the coils 21 are arranged in a predetermined arrangement order.

In the fourth embodiment, since the number of coil unit supports 33 to be turned is one, the handling of the jumper wire becomes easy. Therefore, even in the case of a motor of a large number of phases, an array coil group can be reliably obtained.

REFERENCE SIGNS LIST 2 coil wire
3 feed section
4 deformation section
12 drive roll and driven roll
13 press roll
14 support roll
15 push roll
16 guide
17 compact
20 coil unit
21 coil
22 jumper wire
23 array coil group
28 coil unit arrangement device
29 control unit
30 arrangement unit
31a holding section
31b receiving section
31c conveying section
32 pawl
33 coil unit support
34 turn table
35 array coil group support
36 turn table
37 divided support
38 guide bar
39 restraint tool
41 holding body
42 coupling
43 rotor
44 through-bar
411 retrogression prevention tool
412 stopper
413 bearing
414 rotary shaft
71 guide tape
120 coil unit
121 coil
122 jumper wire
220 coil unit
221 coil
222 jumper wire
320 coil unit including divided stator cores
321 coil
322 jumper wire
333 coil unit support
810 stator
811 divided stator core
812 insulating member
820 outer-rotor stator
821 outer-rotor stator core
P tacking tape
TT central axis

The invention claimed is:

1. A coil unit arrangement device that forms an array coil group by arranging in a predetermined arrangement order each relevant coil of a coil unit in which a plurality of coils corresponding to a plurality of phases is connected by a jumper wire for each phase, comprising:
    a holding section provided with a rotatable coil unit support that supports the coil unit;
    a receiving section provided with an array coil group support that supports the array coil group, the receiving section relatively turning with respect to the holding section;
    a conveying section configured to convey the coil of the coil unit supported by the rotatable coil unit support to the array coil group support; and
    a control unit configured to control, in forming the array coil group by extracting and arranging the coil from the coil unit on the basis of the predetermined arrangement order, the holding section, the receiving section, and the conveying section so that a first jumper wire between the array coil group and the coil to be extracted is arranged on a same side of a second jumper wire between the array coil group and another coil of the coil unit.

2. The coil unit arrangement device according to claim 1, wherein the coil unit support is constituted by combining a divided support.

3. The coil unit arrangement device according to claim 1, wherein the array coil group support is constituted by combining a divided support.

4. The coil unit arrangement device according to claim 1, wherein the coil unit support and the array coil group support each include a through-hole, and the conveying section includes a removable guide bar that extends through the through-hole; and
    the coil is conveyed while connecting the coil unit support and the array coil group support with the removable guide bar.

* * * * *